United States Patent
Miyakoshi et al.

(10) Patent No.: US 10,783,184 B2
(45) Date of Patent: Sep. 22, 2020

(54) DATA GENERATION METHOD AND COMPUTER SYSTEM

(71) Applicant: Hitachi, Ltd., Tokyo (JP)

(72) Inventors: Junichi Miyakoshi, Tokyo (JP); Masanao Yamaoka, Tokyo (JP); Hiromasa Takahashi, Tokyo (JP); Shirun Ho, Tokyo (JP); Kenzo Kurotsuchi, Tokyo (JP); Sanato Nagata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 301 days.

(21) Appl. No.: 15/593,428

(22) Filed: May 12, 2017

(65) Prior Publication Data
US 2018/0004860 A1 Jan. 4, 2018

(30) Foreign Application Priority Data

Jun. 30, 2016 (JP) ................................. 2016-129753

(51) Int. Cl.
*G06N 20/00* (2019.01)
*G06F 16/901* (2019.01)
(Continued)

(52) U.S. Cl.
CPC ...... *G06F 16/9024* (2019.01); *G06F 16/2379* (2019.01); *G06F 16/258* (2019.01); *G06N 20/00* (2019.01); *G06N 3/0454* (2013.01)

(58) Field of Classification Search
CPC ............. G06F 16/9024; G06F 16/2379; G06F 16/258; G06N 20/00; G06N 3/0454
See application file for complete search history.

(56) References Cited

U.S. PATENT DOCUMENTS

| 5,715,005 A * | 2/1998 | Masaki ................ H04N 19/503 348/699 |
| 2006/0184471 A1* | 8/2006 | Minamino ............ G10L 15/144 706/16 |

(Continued)

FOREIGN PATENT DOCUMENTS

| JP | 3012297 B2 * | 2/2000 | ............. G06B 23/02 |
| JP | 2008-116588 A | 5/2008 | |
| WO | WO-0173428 A1 * | 10/2001 | ........... G06K 9/6224 |

OTHER PUBLICATIONS

Malliaros et al., Clustering and Community Detection in Directed Networks: A Survey, Aug. 6, 2013, all pages. (Year: 2013).*

*Primary Examiner* — Jay A Morrison
*Assistant Examiner* — Antonio J Caiado
(74) *Attorney, Agent, or Firm* — Mattingly & Malur, PC

(57) ABSTRACT

A computer includes a data generation unit and a storage unit which retains graph information for managing a graph configured from a plurality of vertexes and sides. The data generation unit performs acquiring a plurality of data and graph information and assuring storage regions in number equal to the number of vertexes, converting each data into an input value and setting at least one input value to a storage region corresponding to at least one vertex, executing an updating process for updating a value set to a storage region corresponding to a first vertex using the value set to the storage region corresponding to the first vertex and a value set to a storage region corresponding to a different vertex directly connected to the first vertex, and outputting a set of values set to the storage regions corresponding to the vertexes as the feature value.

10 Claims, 21 Drawing Sheets

(51) Int. Cl.
*G06F 16/25* (2019.01)
*G06F 16/23* (2019.01)
*G06N 3/04* (2006.01)

(56) References Cited

U.S. PATENT DOCUMENTS

| | | | | |
|---|---|---|---|---|
| 2007/0185825 A1* | 8/2007 | Ito | ................... | G06K 9/00335 |
| | | | | 706/30 |
| 2007/0204169 A1* | 8/2007 | Bahl | ................... | G06Q 30/02 |
| | | | | 713/189 |
| 2011/0004631 A1* | 1/2011 | Inokuchi | ............. | G06F 16/9024 |
| | | | | 707/798 |
| 2011/0060750 A1* | 3/2011 | Kuhn | ................. | G06F 16/9027 |
| | | | | 707/758 |
| 2011/0182479 A1* | 7/2011 | Sese | ................... | G06F 16/9024 |
| | | | | 382/113 |
| 2011/0208469 A1* | 8/2011 | Sheye | ................. | G06F 11/3684 |
| | | | | 702/123 |
| 2012/0137367 A1* | 5/2012 | Dupont | ................... | G06F 21/00 |
| | | | | 726/25 |
| 2013/0332667 A1* | 12/2013 | Uchigaito | ............ | G11C 7/1072 |
| | | | | 711/105 |
| 2014/0136555 A1* | 5/2014 | Jacob | ................. | G06F 16/9535 |
| | | | | 707/754 |
| 2015/0067695 A1* | 3/2015 | Hamamoto | ........... | G06F 9/5016 |
| | | | | 718/104 |
| 2015/0146954 A1* | 5/2015 | Hatanaka | ............. | G06K 9/4647 |
| | | | | 382/131 |
| 2015/0381515 A1* | 12/2015 | Mattson | ................ | H04L 41/145 |
| | | | | 707/609 |
| 2016/0124739 A1* | 5/2016 | Zongker | ............. | G06F 16/9024 |
| | | | | 717/172 |
| 2016/0342708 A1* | 11/2016 | Fokoue-Nkoutche | ....................... | |
| | | | | G06F 16/9024 |
| 2017/0083824 A1* | 3/2017 | Miyakoshi | .............. | G06N 7/005 |
| 2017/0277105 A1* | 9/2017 | Tomino | .............. | G03G 15/6529 |
| 2018/0373766 A1* | 12/2018 | Crabtree | .............. | G06F 16/254 |

* cited by examiner

FIG. 4

GRAPH DATA (121)

| VERTEX ID (401) | OUTFLOW VERTEX ID (402) | INFLOW VERTEX ID (403) | VERTEX DATA REGION (404) | | |
|---|---|---|---|---|---|
| | | | TIME SERIES DATA A | TIME SERIES DATA B | ... |
| I0 | I1,I6 | I1,I6 | 0 | 2 | ⋮ |
| I1 | I0,I2,I7 | I0,I2,I7 | 10 | 20 | ⋮ |
| I2 | I1,I3,I8 | I1,I3,I8 | 20 | 5 | ⋮ |
| ⋮ | ⋮ | ⋮ | ⋮ | ⋮ | ⋮ |

(400)

| DATA ID (411) | VERTEX ID (412) | STANDARDIZATION CONSTANT (413) |
|---|---|---|
| TIME SERIES DATA A | I14 | 1 |
| TIME SERIES DATA B | I15,I21 | 2 |
| TIME SERIES DATA C | I21 | 1 |
| TIME SERIES DATA D | I20 | 1 |
| ⋮ | ⋮ | ⋮ |

(410)

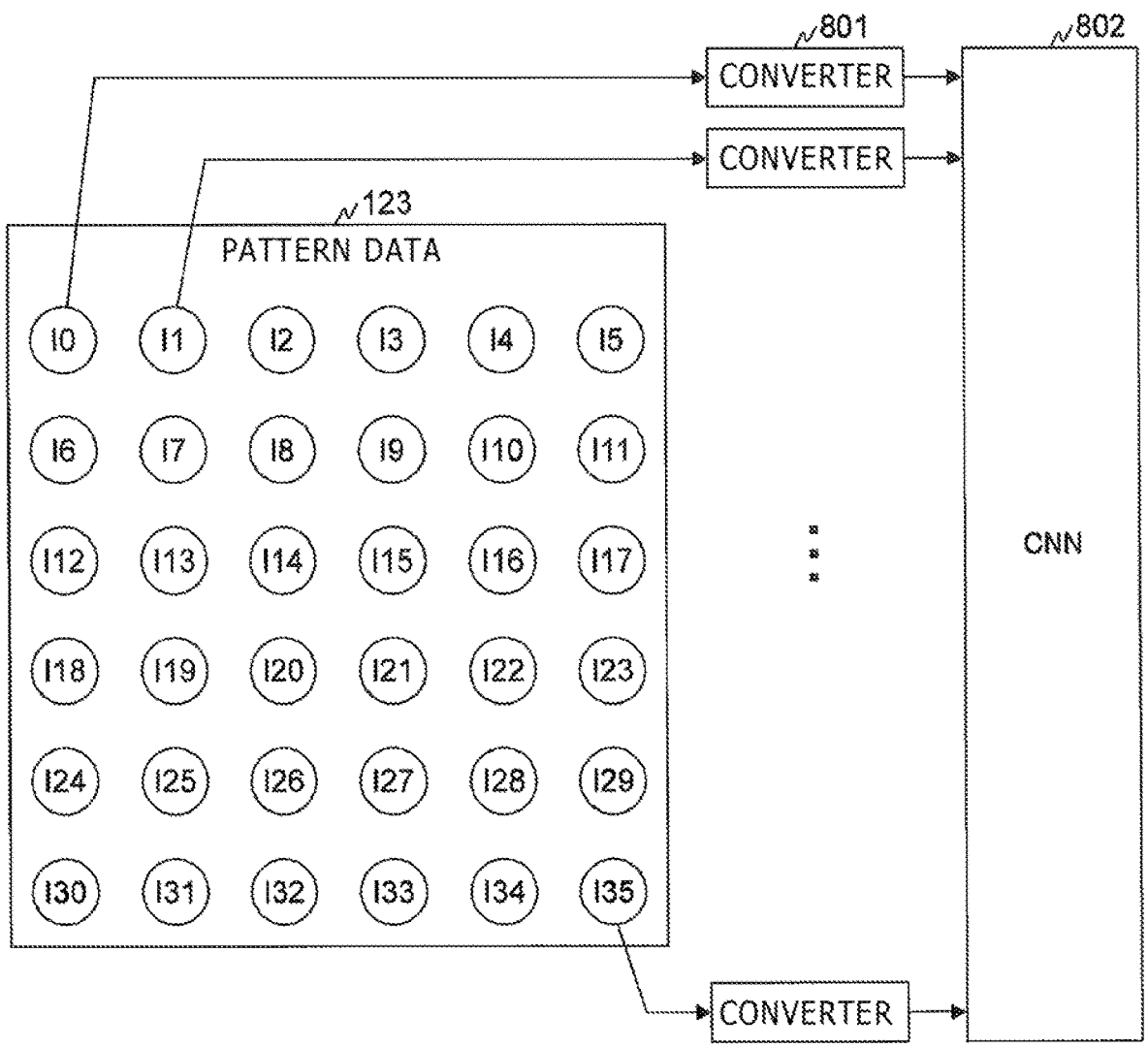

FIG.10

| CLASS | IDENTIFICATION ACCURACY [%] OF INVENTION | IDENTIFICATION ACCURACY [%] OF PRIOR ART |
|---|---|---|
| 1 | 97.6(100) | 95.8(85.0) |
| 2 | 98.5(100) | 95.3(88.7) |
| 3 | 98.1(97.9) | 94.4(83.3) |
| 4 | 95.2(99.1) | 97.6(94.1) |

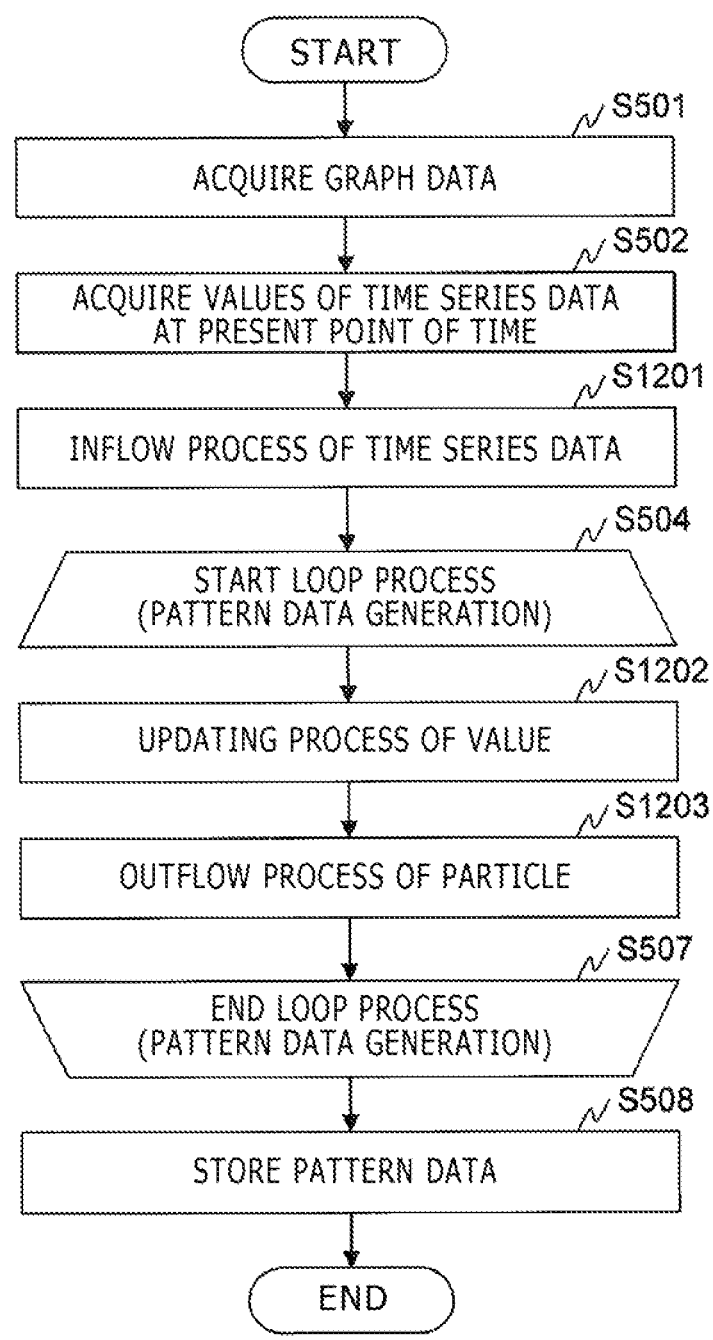

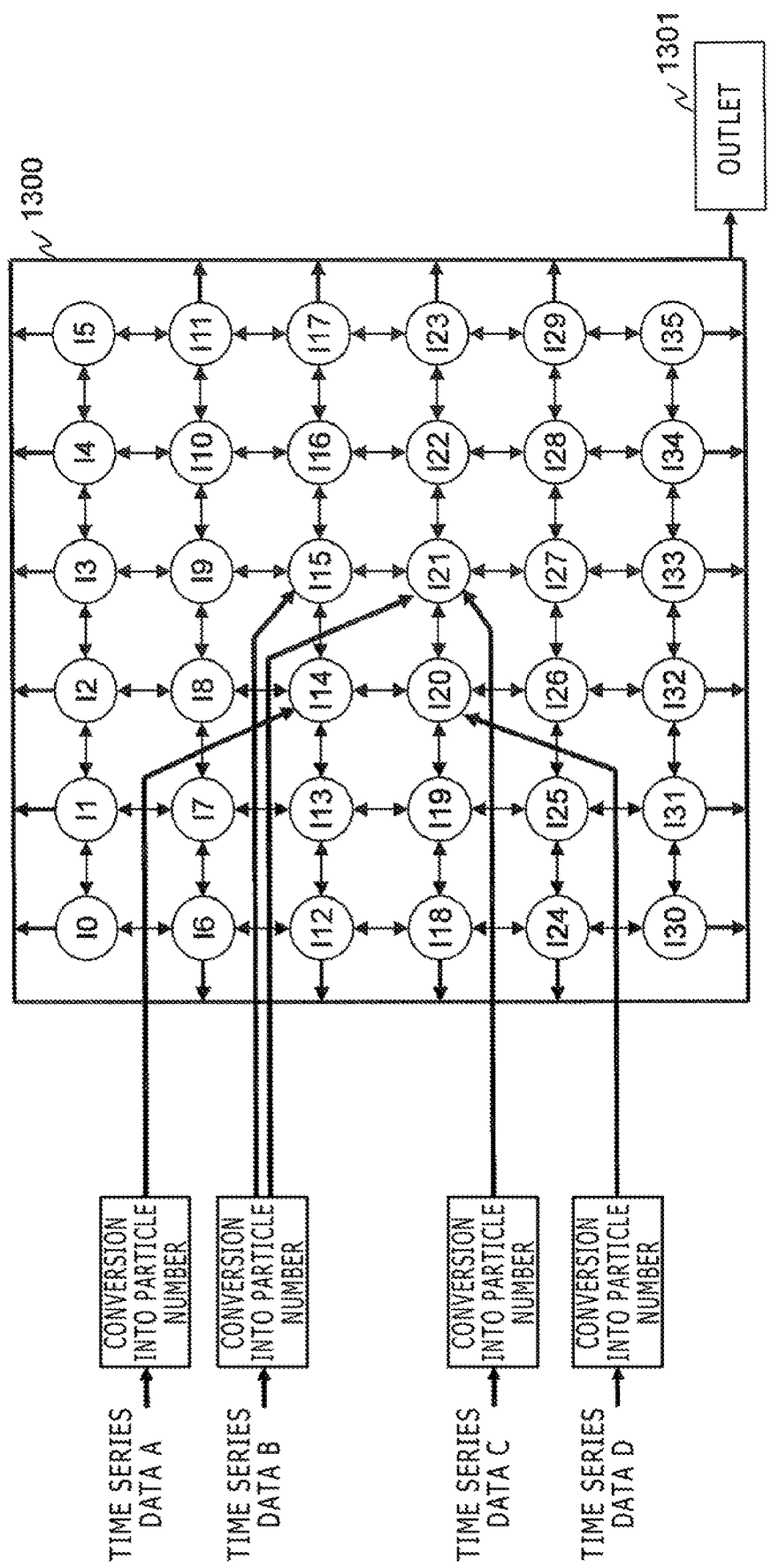

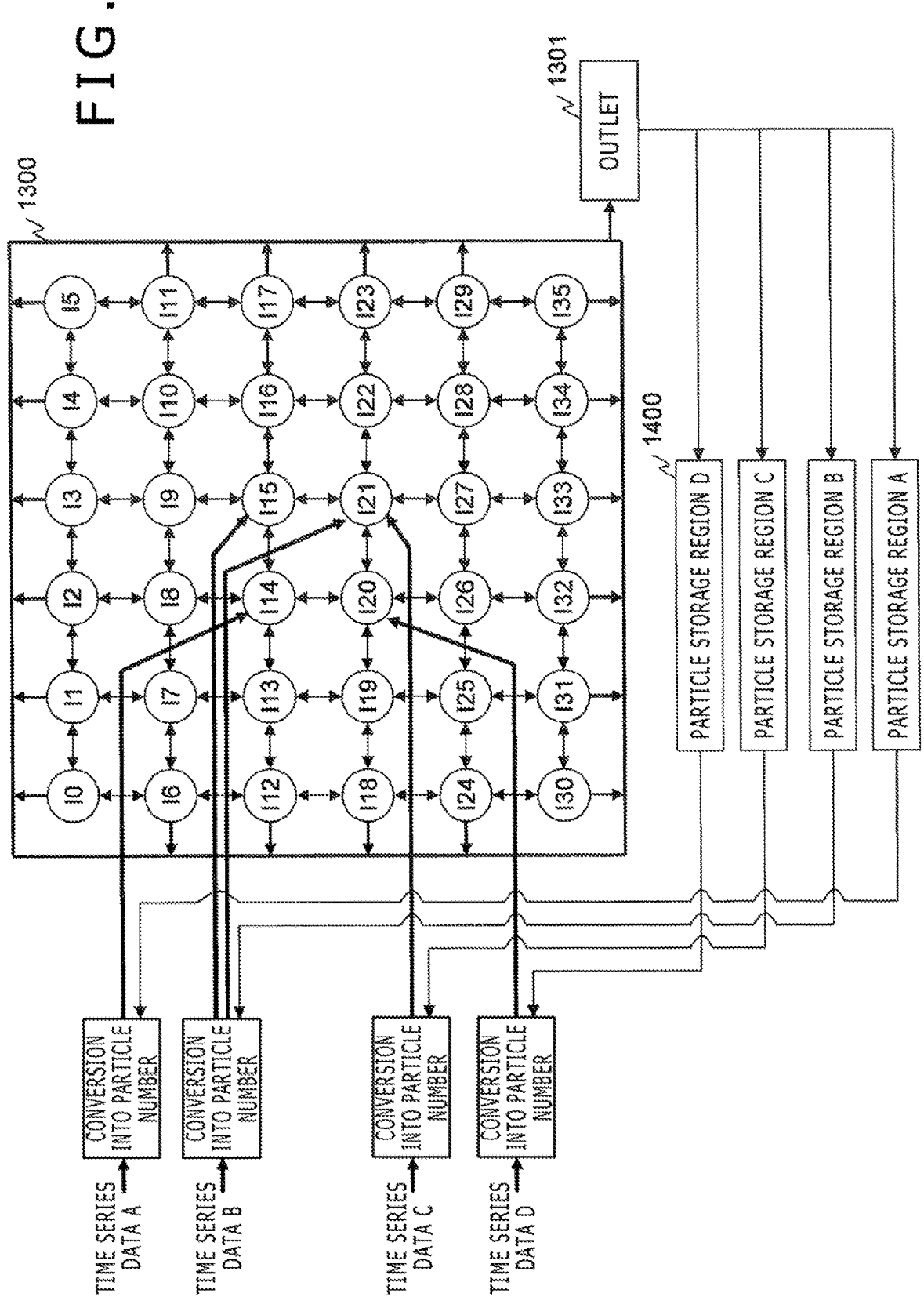

FIG.15A
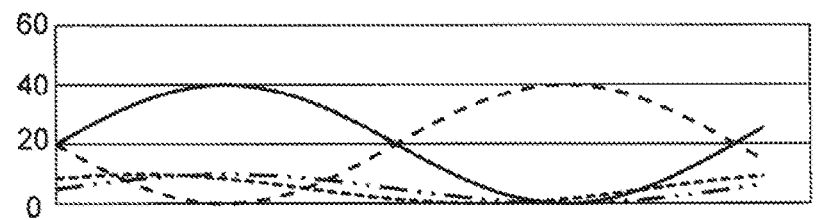
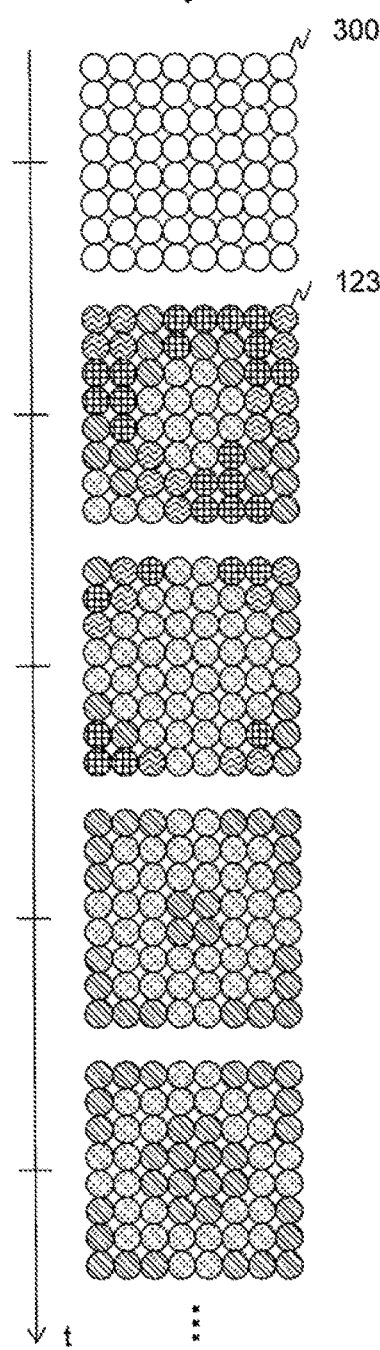

FIG. 15B
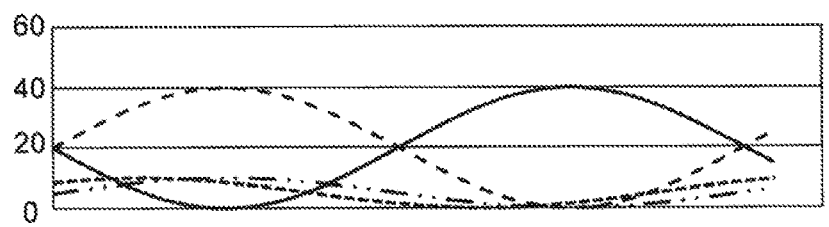
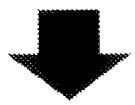
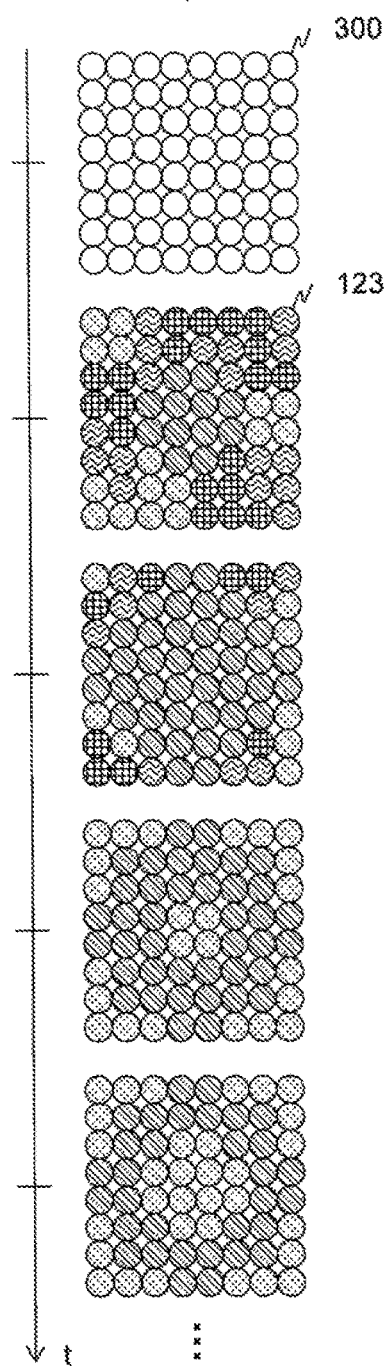

FIG.16

| VERTEX ID /401 | OUTFLOW VERTEX ID /402 | INFLOW VERTEX ID /403 | ACTIVE VERTEX ID /1601 | SUPPRESSION VERTEX ID /1602 | VERTEX DATA REGION /404 | |
|---|---|---|---|---|---|---|
| | | | | | TIME SERIES DATA A | ... |
| ⋮ | ⋮ | ⋮ | ⋮ | ⋮ | ⋮ | ⋮ |
| I13 | I7,I12,I14 | I12,I14,I19 | I12,I14,I19 | I16 | 10 | ⋮ |
| I14 | I8,I13 | I3,I20 | I13,I20 | I17 | 20 | ⋮ |
| ⋮ | ⋮ | ⋮ | ⋮ | ⋮ | ⋮ | ⋮ |

400

DATA GENERATION METHOD AND COMPUTER SYSTEM

CLAIM OF PRIORITY

The present application claims priority from Japanese patent application JP 2016-129753 filed on Jun. 30, 2016, the content of which is hereby incorporated by reference into this application.

BACKGROUND OF THE INVENTION

1. Field of the Invention

The present invention relates to a method and a system for generating data (feature value) for classifying an identification target into a predetermined class using a plurality of time series data.

2. Description of the Related Art

Attention is attracted to a technology for analyzing or predicting a state of the social infrastructure or the like from data of the real world and cyberspace or controlling the social infrastructure or the like for the purpose of efficient design and operation of the social infrastructure, cities and so forth.

Within the technology described above, an identification technology especially of input data occupies an important role. Input data is configured from audio data, sensing data of a chemical substance, a temperature, a humidity or the like, log data of a machine such as an automobile or the like and a computer, and log data of an e-mail, a social networking service (SNS) or the like.

An identification process in which input data is used is a process of classifying in what state an environment and elements (a person, a thing, information and so forth) are. In particular, the identification process is a process for determining a class to which input data belongs from among a plurality of classes defined in advance. For example, a class representative of a traffic state such as "traffic jam" or "accident," a class representative of a substance of a target such as "explosive" and so forth are available.

In an identification process in which time series data is used as input data, generally time series data is converted into a statistical feature value such as an average or a variance in the time direction or frequency conversion. Then, a class to which the input data belongs is determined using the statistical feature value.

The method described above has a problem in that the identification accuracy decreases significantly when the time series data exhibits a complicated transient response, when a plurality of time series data having different features from each other exist (when lengths in the time direction in determining a statistical feature value are different from each other) or when the relationship between a plurality of time series data has some noise.

For example, in an identification process for classifying a type or the like of an object using a plurality of chemical sensing data, since the chemical substance disperses from the object through the space and reaches a sensor, depending upon the measurement environment, a significant dispersion appears in the arrival time. When a plurality of chemical substances are measured, transient responses between sensing data of the chemical substances exhibit a state in which noise appears therein.

As a technology for extracting a feature value of time series data, a technology disclosed in JP-2008-116588-A is known. JP-2008-116588-A describes: "a one-dimensional time series signal is analyzed by an unsteady chaos analysis, and a high order local autocorrelation coefficient is calculated from a two-dimensional image generated by the analysis to extract a feature. The calculation of the high order local autocorrelation coefficient is performed on the basis of binary image information generated by converting two-dimensional image information into binary information using a threshold value obtained by calculating a histogram of a two-dimensional image generated by the analysis of the one-dimensional time series signal. The one-dimensional time series signal is an audio signal or an acoustic signal, and the unsteady chaos analysis is performed by a recurrence plot technique."

SUMMARY OF THE INVENTION

Generally, when a time variation of data is to be identified, a secondary feature value is generated for multidimensional input data for each dimension and is inputted to an identification unit such as a neural network or a support vector machine or the like to perform machine learning. The secondary feature value may be a feature value calculated by a statistical process such as a histogram, an average value or a variance value in the time direction and so forth, or a frequency, a phase or the like calculated using fast Fourier transform (FFT) or the like. In the case of the learning method described above, although fitting to teacher data used upon learning can be performed with high accuracy, the identification accuracy for unknown data degrades.

Further, even if the technology of JP-2008-116588-A is expanded to multidimensional input data, since the relationship between dimensions (influence between input data) is not taken into consideration, a high degree of identification accuracy cannot be implemented.

It is considered that, since the known technology has a problem in the feature value, the identification accuracy of the identification process for a plurality of time series data is low. The present invention provides a method and a system for generating data including a feature value with which an identification process of high accuracy for a plurality of time series data is implemented.

According to a typical example of the invention disclosed in the present application, there is provided a data generation method for a computer system which includes a plurality of computers each including a processor, a memory connected to the processor and a network interface connected to the processor, at least one of the computers including a data generation unit configured to acquire a plurality of data and generate pattern data representative of a feature value for identifying a class to which an identification target belongs using the plurality of data, at least one of the computers including a storage unit configured to retain graph information for managing a graph configured from a plurality of vertexes and sides which connect the plurality of vertexes to each other, the data generation method including a first step by the data generation unit of acquiring the plurality of data and the graph information and assuring storage regions in number equal to the number of vertexes included in the graph for storing the plurality of data, a second step by the data generation unit of converting each of the plurality of data into an input value and setting at least one input value to a storage region corresponding to at least one of the vertexes included in the graph, a third step by the data generation unit of executing an updating process for updating a value set to a storage region corresponding to a first vertex using the value set to the storage region corresponding to the first vertex and a value set to a storage region corresponding to a different vertex directly connected to the first vertex, and a fourth step by the data generation unit of outputting a set of values set to the storage regions individually corresponding to the plurality of vertexes included in the graph as the pattern data.

With the present invention, pattern data which is a feature value on which an influence between data and a transient response of data are reflected can be generated. The identification accuracy of the identification process can be improved by using the pattern data. Subjects, constitutions and effects other than those described above will become apparent from the following description of the embodiments.

BRIEF DESCRIPTION OF THE DRAWINGS

FIG. 4 is a view illustrating an example of graph data in the embodiment 1;

FIG. 8 is a diagrammatic view illustrating an example of an inputting method of pattern data to an identification unit in the embodiment 1;

FIG. 9 is a view illustrating an example of a list used when a converter in the embodiment 1 converts data of a vertex;

FIG. 10 is a view illustrating identification accuracy of an identification process of a computer in the embodiment 1;

FIG. 12 is a flow chart illustrating a pattern data generation process executed by a data processing unit in an embodiment 2;

FIGS. 13 and 14 are diagrammatic views illustrating concepts of an inflow process of time series data and an outflow process of a particle in the embodiment 2;

FIGS. 15A and 15B are diagrammatic views illustrating different examples of pattern data in the embodiment 2;

FIG. 16 is a view illustrating an example of structure data of graph data in an embodiment 3;

DESCRIPTION OF THE PREFERRED EMBODIMENTS

Embodiment 1

First, a generation method of pattern data using a plurality of time series data and an identification process using pattern data according to an embodiment 1 are described.

Figure 1:
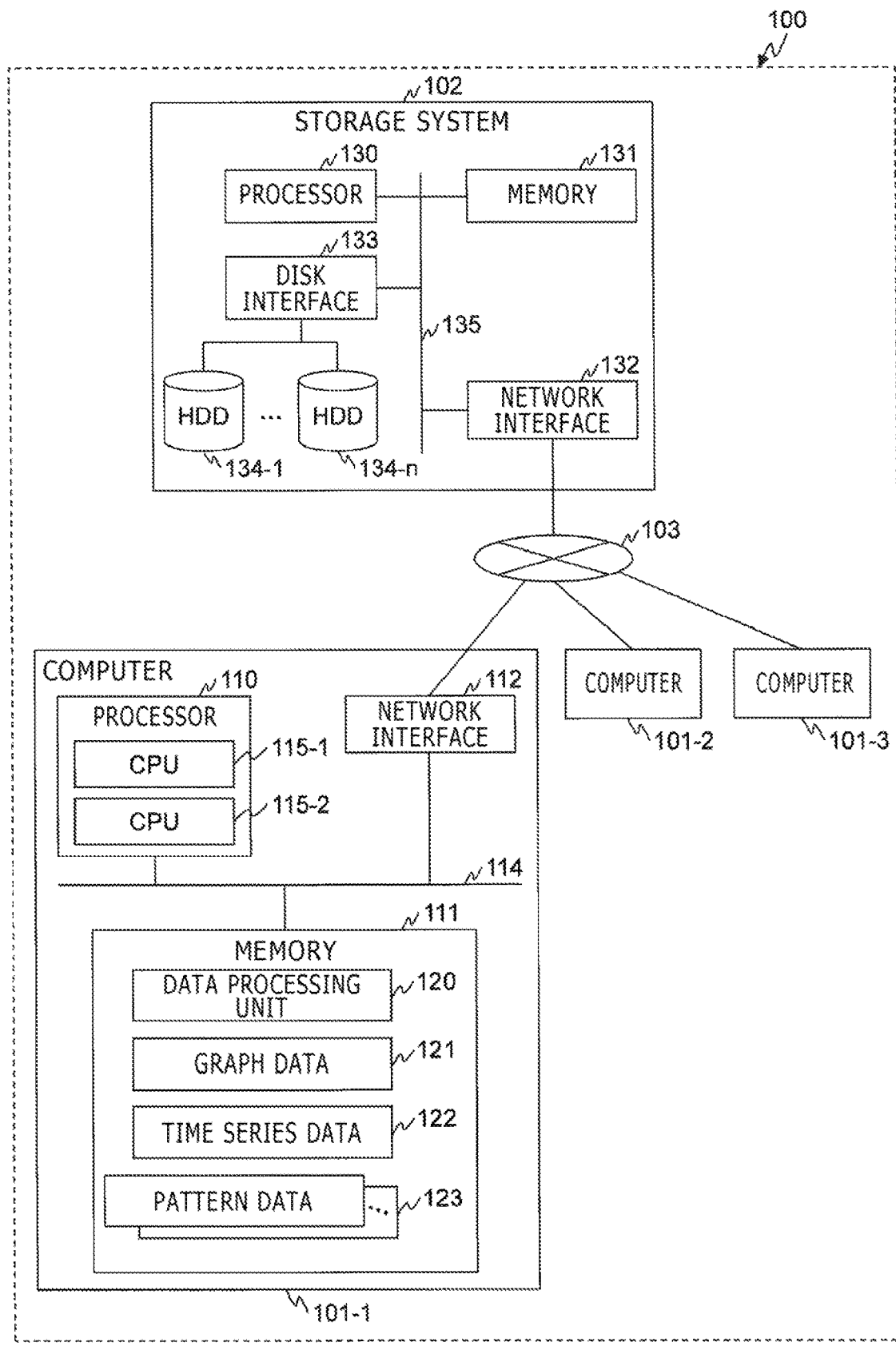
FIG. 1 is a block diagram depicting an example of a configuration of a computer system of an embodiment 1.

FIG. 1 is a block diagram depicting an example of a configuration of a computer system 100 of the embodiment 1.

As depicted in FIG. 1, the computer system 100 of the embodiment 1 is configured from a plurality of computers 101 and a storage system 102, which are connected to each other by a network 103.

The computer system 100 of the embodiment 1 include three computers 101-1, 101-2 and 101-3. It is to be noted that the number of computers 101 may otherwise be smaller than 3 or greater than 3.

The network 103 may be a wide area network (WAN), a local area network (LAN), a storage area network (SAN) or the like. It is to be noted that the embodiment 1 is not limited in regard to the type of the network 103. Further, the network which connects the computers 101 and the network which connects each of the computers 101 and the storage system 102 may be different from each other.

Each of the computers 101 executes a pattern data generation process, an identification process in which generated pattern data is used, and further processes. The computer 101 includes a processor 110, a memory 111 and a network interface 112, which are connected to each other by a bus 114.

The processor 110 includes one or more central processing units (CPUs) 115 which execute an arithmetic operation process. Each of the CPUs 115 implements functions of the computer 101 by executing a program stored in the memory 111. Further, a process to be executed in the computer 101 is executed by one or more of the CPUs 115. It is to be noted that a plurality of processes may be executed by one CPU 115. It is to be noted that the CPU 115 may be an arithmetic operation unit such as a field programmable gate array (FPGA) or a graphics processing unit (GPU).

In the description given below, where a process is described using a functioning unit (module) as a subject, this represents that the CPU 115 is executing a program which implements the functioning unit.

The memory 111 stores programs to be executed by the CPU 115 (processor 110) and information to be used in the programs. The programs and the information stored in the memory 111 are hereinafter described. Further, the memory 111 includes a memory space allocated to a process executed by the CPU 115.

It is to be noted that the memory space may be secured in the memory area of a plurality of memories 111 or may be secured in the memory area of one memory 111. Further, the memory 111 may include a single memory space allocated to a plurality of processes or may include a plurality of memory spaces individually allocated to a plurality of processes.

The network interface 112 communicates with an external apparatus through the network 103. In the embodiment 1, the processor 110 accesses a different computer 101 or the storage system 102 through the network interface 112.

The storage system 102 stores various data to be used by the computer 101. The storage system 102 includes a processor 130, a memory 131, a network interface 132, a disk interface 133 and a plurality of hard disk drives (HDDs) 134, which are connected to each other by a bus 135.

The processor 130, memory 131 and network interface 132 are same as the processor 110, memory 111 and network interface 112, respectively. The disk interface 133 is an interface for connecting to the plurality of HDDs 134. Each of the HDDs 134 is a storage apparatus for storing various data. It is to be noted that the storage system 102 may have a storage apparatus other than an HDD such as a solid state drive (SSD).

Here, the programs and the information stored in the memory 111 of the computer 101 are described. The memory 111 stores a program which implements a data processing unit 120. Further, the memory 111 stores graph data 121, time series data 122 and pattern data 123.

The data processing unit 120 executes a pattern data generation process and an identification process. It is to be noted that the data processing unit 120 may execute a process other than the processes described above.

In the pattern data generation process, the data processing unit 120 (CPU 115) inputs values of time series data to vertexes included in a graph to be used for generation of the pattern data 123 and updates the values of the time series data set to the vertexes to generate pattern data 123. Here, the graph is configured from a plurality of vertexes and a plurality of sides connecting the vertexes to each other.

In the identification process, the data processing unit 120 (CPU 115) converts data of an identification target into pattern data 123 and inputs the pattern data 123 to an identification unit to perform predetermined identification. In the embodiment 1, a convolutional neutral network (CNN) or a neural network (NN) is used as the identification unit. The NN is used for general data recognition, and the CNN is used for image recognition and so forth.

It is to be noted that the data processing unit 120 may be configured from a plurality of program modules. For example, the data processing unit 120 may include a data generation unit for generating pattern data 123 and an identification processing unit for executing an identification process. Alternatively, different program modules may be provided in different computers 101.

The graph data 121 is data of a graph configured from a plurality of vertexes and a plurality of sides. Details of the graph data 121 are hereinafter described with reference to FIGS. 3A, 3B and 4.

The time series data 122 is data of an identification target. The time series data 122 retains values included in a predetermined range of time including the present point of time or values of a predetermined number of samples including a value at present. It is to be noted that a plurality of time series data 122 may be stored in the memory 111. The plurality of time series data 122 may be data of the same type or data of different types. An example of the time series data 122 is hereinafter described with reference to FIG. 2.

The pattern data 123 is a feature value generated from a plurality of time series data 122 and is given as a set of values set to vertexes of the graph.

In the embodiment 1, the graph data 121 and the time series data 122 are stored in the storage system 102. Accordingly, the CPU 115 acquires the graph data 121 and the time series data 122 from the storage system 102 and loads the acquired graph data 121 and time series data 122 into the memory 111.

Figure 2:
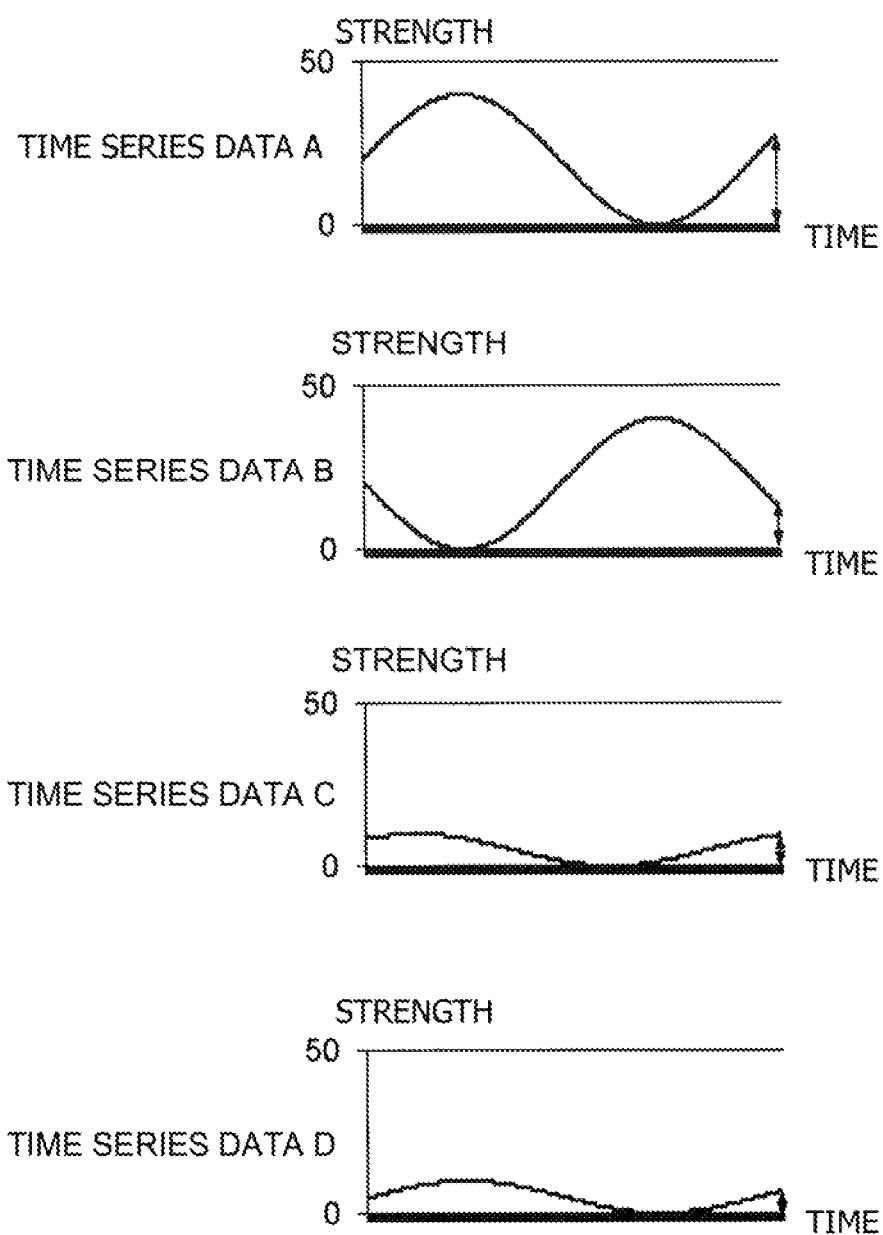
FIG. 2 is a diagrammatic view illustrating an example of time series data in the embodiment 1.

FIG. 2 is a view illustrating an example of the time series data 122 in the embodiment 1.

FIG. 2 illustrates four time series data 122 of time series data A, time series data B, time series data C and time series data D. The ordinate and abscissa of the time series data 122 depicted in FIG. 2 represent strength and time, respectively.

In the embodiment 1, it is supposed that each time series data 122 which varies as time passes in the real world is converted into pattern data 123. In this case, the data processing unit 120 cyclically acquires a value (strength) at present of the time series data 122 to generate pattern data 123.

It is to be noted that, if time series data 122 indicative of a history in the past or the like is inputted, then the data processing unit 120 sets simulation time as a variable and acquires the value of the simulation time of each time series data 122. A generation method of pattern data 123 using time series data 122 indicative of a history in the past or the like is hereinafter described as a modification to the embodiment 1.

Figure 3A:
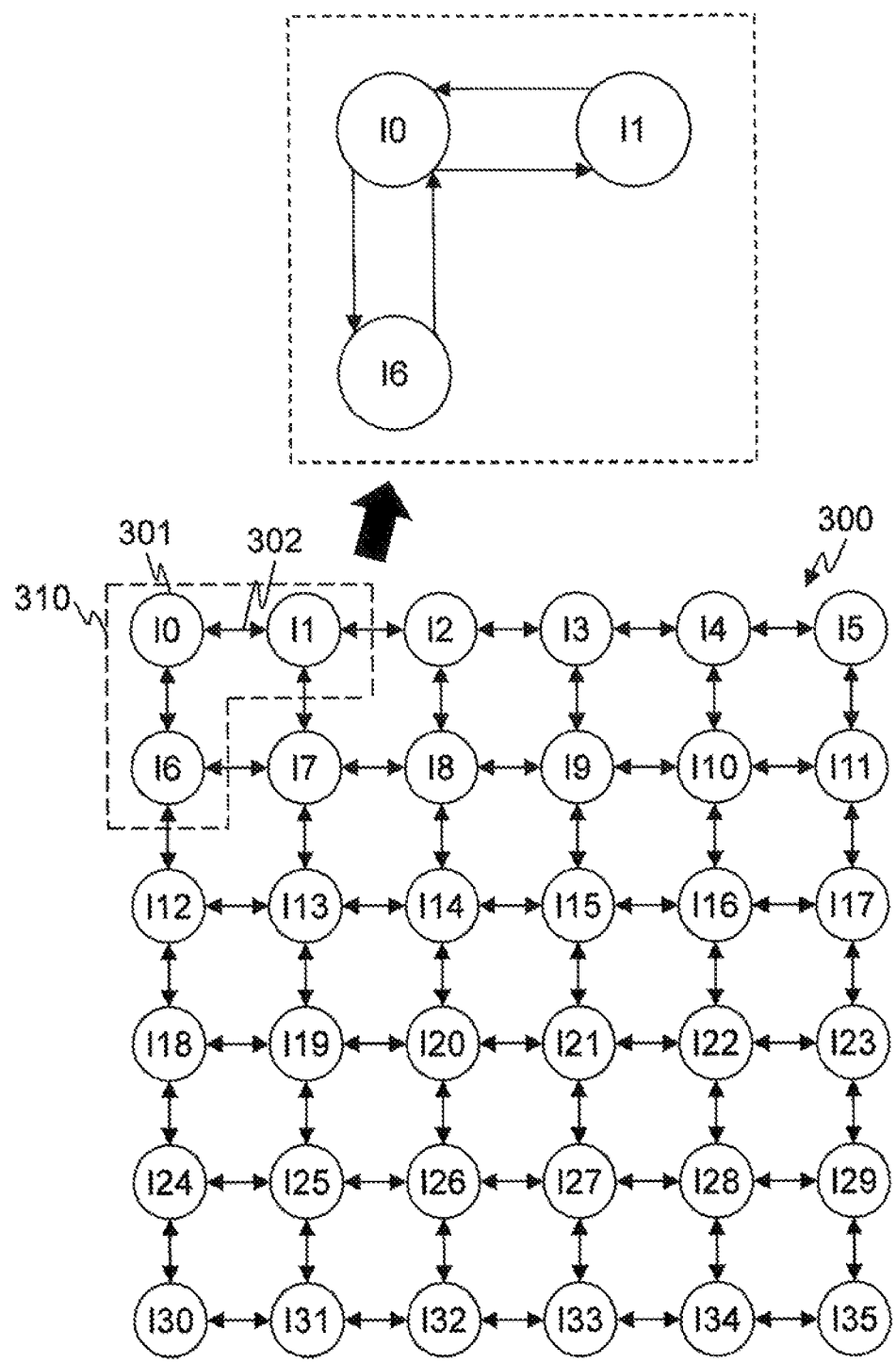
FIGS. 3A and 3B are diagrammatic views illustrating different examples of a graph in the embodiment 1.
Figure 3B:
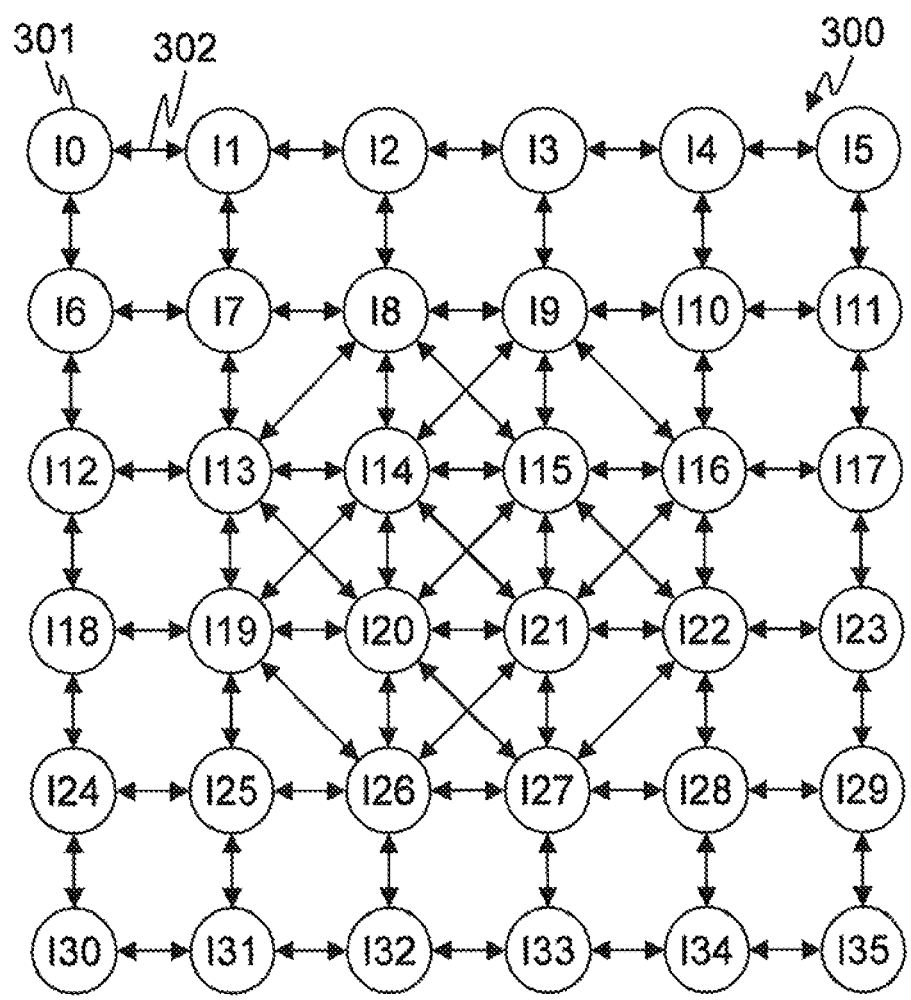

FIGS. 3A and 3B are diagrammatic views illustrating examples of a graph in the embodiment 1. FIG. 4 is a view illustrating an example of the graph data 121 in the embodiment 1.

A graph 300 is configured from a plurality of vertexes 301 and a plurality of sides 302. Each of the vertexes 301 is connected to another vertex 301 through a side 302. A double-sided arrow mark of a side which connects vertexes 301 to each other indicates directions of interactions.

The graph 300 depicted in FIG. 3A is a lattice-shaped directed graph configured from six vertexes 301 both in the vertical and horizontal directions. As depicted in an enlarged view of a portion of the graph 300 in a frame 310, a vertex I0 (301) is a vertex from which data flows out to a different vertex I1 (301) and into which data flows from the different vertex I1 (301).

In the pattern data generation process, a value of the time series data 122 is set to at least one vertex 301. The value set to the vertex 301 is updated using the value set to the own vertex 301 and the value set to a neighboring vertex 301. A set of values set to the vertexes 301 of the graph 300 is outputted as pattern data 123.

It is to be noted that the graph 300 is not limited to such a lattice-shaped graph as depicted in FIG. 3A. For example, such a graph 300 as depicted in FIG. 3B may be used. The graph 300 depicted in FIG. 3B has a greater number of sides 302 in the proximity of the center thereof than that of the graph 300 depicted in FIG. 3A.

Referring to FIG. 4, the graph data 121 which is data for managing the graph 300 includes structure data 400 and inflow definition data 410.

The structure data 400 is data for managing the structure of the graph 300 and the values set to the vertexes 301. The structure data 400 includes a plurality of entries each configured from a vertex ID 401, an outflow vertex ID 402, an inflow vertex ID 403 and a vertex data region 404.

The vertex ID 401 is an identifier for uniquely identifying each vertex 301 included in the graph 300. Each of the outflow vertex ID 402 and the inflow vertex ID 403 is an identifier of a vertex 301 directly connected through a side 302 to a vertex 301 corresponding to the vertex ID 401. The outflow vertex ID 402 is an identifier of a vertex 301 connected through a side 302 directed from a vertex 301 corresponding to the vertex ID 401 to a different vertex 301. The inflow vertex ID 403 is an identifier of a vertex 301 connected through a side 302 directed from a different vertex 301 to the vertex 301 corresponding to the vertex ID 401.

By defining each vertex ID as the outflow vertex ID 402 and the inflow vertex ID 403 separately, the connection relationship of the vertexes can be managed. It is to be noted that, where all vertexes 301 are connected by bidirectional sides 302 as depicted in FIG. 3A, the identifier of the same vertex 301 is stored in the outflow vertex ID 402 and the inflow vertex ID 403.

The vertex data region 404 stores values of the individual time series data 122 set to a vertex 301 corresponding to the vertex ID 401. In the vertex data region 404 for one entry, columns in number equal to the number of the time series data 122 inputted to the graph 300 are generated. In each column, an identifier of the time series data 122 is set. For example, where four time series data 122 are inputted to the graph 300, four columns are generated in the vertex data region 404.

It is to be noted that the vertex data region 404 may be managed otherwise as information separate from the structure data 400. It is to be noted that a plurality of time series data 122 may share one column in the vertex data region 404. In this case, since the number of time series data 122 and the number of columns of the vertex data region 404 do not coincide with each other, a corresponding relationship of the columns of the vertex data region 404 to the time series data 122 may be determined in advance.

It is to be noted that, where it is necessary to manage an identifier, a length and a vertex 301 to be connected, the structure data 400 may be divided into two data including data for managing the vertexes 301 and data for managing the sides 302.

The inflow definition data 410 is definition information of a vertex 301 to which a value of time series data 122 is to be inputted. The inflow definition data 410 includes a plurality of entries each including a data ID 411, a vertex ID 412 and a standardization constant 413.

The data ID 411 is an identifier for identifying time series data 122. For example, in the data ID 411, a type, a name or the like of time series data 122 is stored. The vertex ID 412 is an identifier of a vertex 301 to which a value of time series data 122 is to be inputted. The standardization constant 413 is a value to be used to standardize a value to be inputted to the vertex 301.

As hereinafter described, the data processing unit 120 standardizes a value of time series data 122 in accordance with the inflow definition data 410 and inputs the standardized value to at least one vertex 301 included in the graph 300. For example, a value of the time series data A is inputted to the vertex 301 whose vertex ID 412 is "I4."

It is to be noted that the structure data 400 and the inflow definition data 410 may be managed otherwise as separate data from each other.

Figure 5:
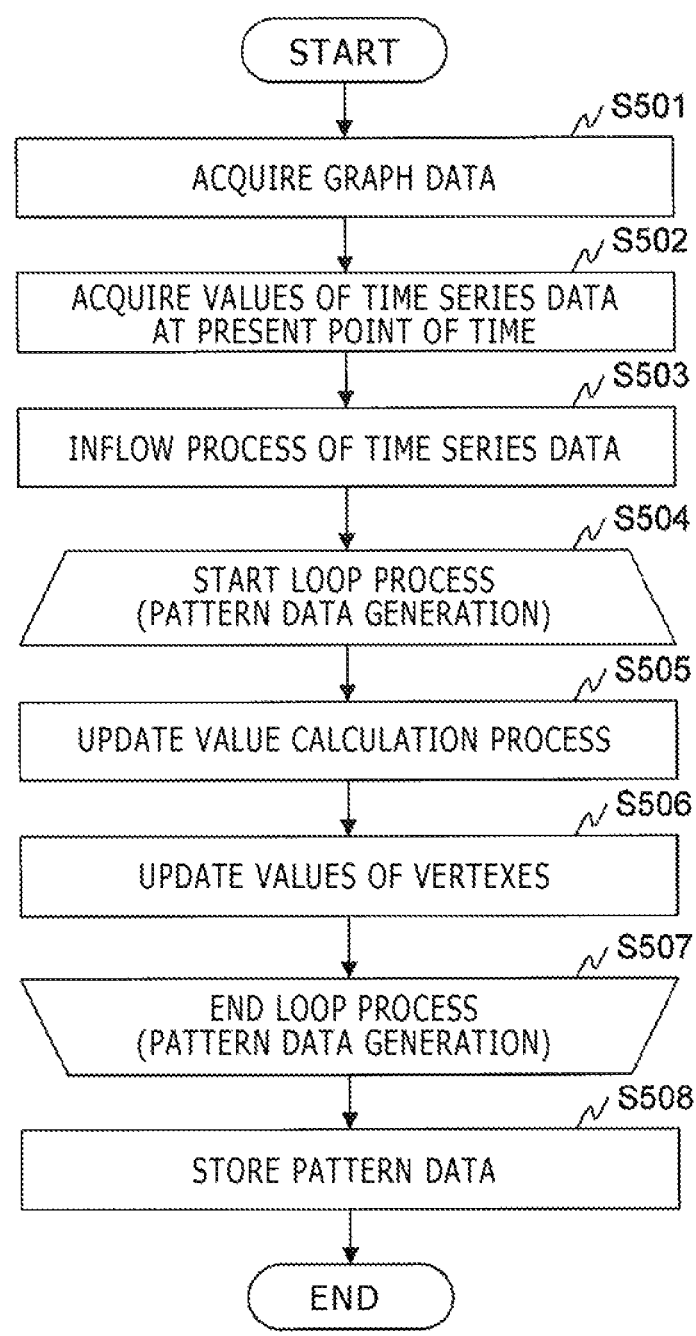
FIG. 5 is a flow chart illustrating a pattern data generation process executed by a data processing unit in the embodiment 1.
Figure 6:
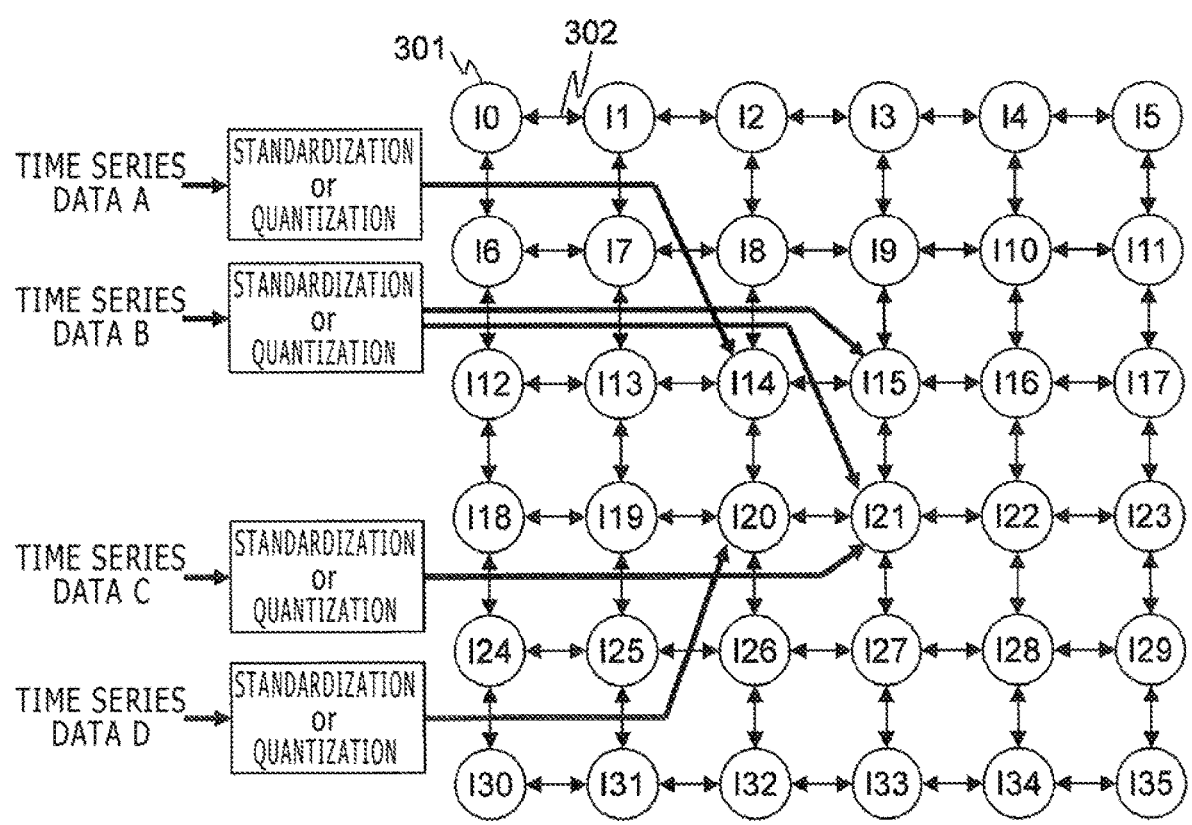
FIG. 6 is a diagrammatic view illustrating a concept of an inflow process of time series data in the embodiment 1.
Figure 7:
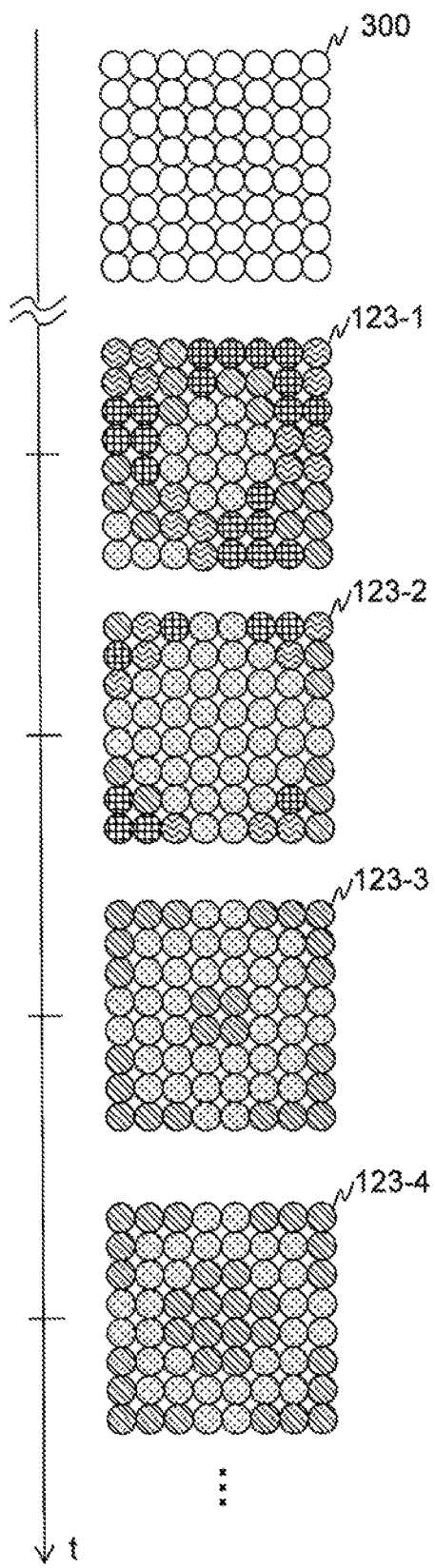
FIG. 7 is a diagrammatic view illustrating an example of pattern data in the embodiment 1.

FIG. 5 is a flow chart illustrating a pattern data generation process executed by the data processing unit 120 in the embodiment 1. FIG. 6 is a diagrammatic view illustrating a concept of an inflow process of time series data 122 in the embodiment 1. FIG. 7 is a diagrammatic view illustrating an example of the pattern data 123 in the embodiment 1.

In the embodiment 1, the data processing unit 120 cyclically executes the pattern data generation process described below.

First, the data processing unit 120 acquires graph data 121 from the storage system 102 and stores the acquired graph data 121 into the memory 111 (step S501). Further, the data processing unit 120 acquires values (latest values) of time series data 122 at the present point of time from the storage system 102 and stores the acquired values into the memory 111 (step S502). It is to be noted that, if the graph data 121 is already stored in the memory 111, then the data processing unit 120 may omit the process at step S501.

Then, the data processing unit 120 executes an inflow process of the time series data 122 (step S503). In particular, the following process is executed.

The data processing unit 120 generates columns in number equal to the number of time series data 122 in the vertex data region 404 of the structure data 400. The data processing unit 120 sets "0" as an initial value to the generated columns. As a data process, the data processing unit 120 generates storage regions in number equal to the number of vertexes 301 for storing values in the memory 111 and sets "0" to the storage regions. It is to be noted that, if columns are already generated in the vertex data region 404, then the process is omitted.

The data processing unit 120 selects a value of a target from among the acquired values of the time series data 122. The data processing unit 120 refers to the data ID 411 of the inflow definition data 410 to search for an entry which coincides with the identifier of the time series data 122 corresponding to the target value.

The data processing unit 120 standardizes the target value on the basis of the standardization constant 413 in the searched out entry. For example, where the value acquired from the time series data A is "30," the data processing unit 120 standardizes the value by dividing the value "30" by the standardization constant "1."

It is assumed that an algorithm to be used for standardization of a value is set in advance in the data processing unit 120. It is to be noted that it is possible to set different algorithms for standardization to different ones of the time series data 122.

The data processing unit 120 acquires an identifier of the vertex 301 from the vertex ID 412 in the searched out entry. The data processing unit 120 refers to the vertex ID 401 of the structure data 400 to search for an entry which coincides with the acquired identifier of the vertex 301.

The data processing unit 120 refers to the vertex data region 404 in the searched out entry to specify a column to which the standardized value is to be set. The data processing unit 120 updates the value in the specified column using the standardized value. For example, the data processing unit 120 overwrites the standardized value in the specified column or adds the standardized value to the value stored in the specified column.

The data processing unit 120 executes the process described above for all of the values of the time series data 122. It is to be noted that, although, in the embodiment 1, a standardized value is inputted to a vertex 301 of the graph 300, alternatively a quantized value may be inputted.

FIG. 6 illustrates a concept of the inflow process of time series data 122 described above. For example, after a value of the time series data A is standardized or quantized, the converted value is inputted to the vertex 301 whose vertex ID 401 is "I4." In the following description, the value of time series data 122 set to a vertex 301 in the inflow process is referred to also as input value. The process at step S503 is such as described above.

Then, the data processing unit 120 starts a loop process for generating pattern data 123 (step S504). The data processing unit 120 sets, upon starting of the loop process, "1" to a variable indicative of the number of times of execution of the loop process. The loop process is repetitively executed by the number of times set in advance.

The data processing unit 120 executes an update value calculation process (step S505). In the update value calculation process, the data processing unit 120 calculates an update value of a vertex 301 of a target on the basis of the value set to the target vertex 301 and a value set to a different vertex 301. In particular, such processes as described below are executed.

The data processing unit 120 refers to the structure data 400 to select one target vertex 301 from among the vertexes 301 included in the graph 300. For example, the data processing unit 120 selects a vertex 301 in order from the top entry of the structure data 400. The data processing unit 120 acquires the inflow vertex ID 403 of the selected entry and searches for an entry which coincides with the identifier of the vertex 301 whose vertex ID 401 is acquired. In the following description, the vertex 301 corresponding to the inflow vertex ID 403 is referred to also as inflow vertex 301.

The data processing unit 120 acquires a value in the vertex data region 404 in the entry corresponding to the target vertex 301 and a value in the vertex data region 404 in the entry corresponding to the inflow vertex 301. The data processing unit 120 uses the values set to the vertexes 301 to calculate an update value for the value set to the target vertex 301. The value set to a vertex 301 is updated by an interaction with a value set to a neighboring vertex 301.

For example, if the columns of the time series data A and the time series data B are included in the vertex data region 404 in the entry corresponding to the target vertex 301, the update value in the time series data A for the target vertex 301 is calculated in accordance with the expression (1) given below and the value in the time series data A of the target vertex 301 is updated in accordance with the expression (2) given below.

[Expression 1]

$$\Delta D_{i,A} = f(D_{i,A}) - g(D_{i,B}) + \sum_j h(D_{j,A}) - \sum_j l(D_{j,B}) \quad (1)$$

[Expression 2]

$$D_{i,A} \leftarrow D_{i,A} + \Delta D_{i,A} \quad (2)$$

where $D_{i,A}$ represents a value of the time series data A before updating set to the target vertex 301 whose identifier is "i"; $D_{i,B}$ a value of the time series data B before updating set to the target vertex 301 whose identifier is "i"; $f(D_{i,A})$ a function which includes $D_{i,A}$ as a variable; $g(D_{i,B})$ a function which includes $D_{i,B}$ as a variable; $h(D_{j,A})$ a function which includes, as a variable, a value of the time series data A set to an inflow vertex 301 whose identifier is "j"; and $l(D_{j,B})$ a function which includes, as a variable, a value of the time series data B set to the inflow vertex 301 whose identifier is "j." It is to be noted that particular functions may be provided in advance or may be determined from a result of an experiment or the like.

The first term of the right side of the expression (1) is a value calculated from a value of the time series data 122 of the update target set to the target vertex 301. The second term of the right side of the expression (1) is a value calculated from a value of different time series data 122 set to the target vertex 301. The third term of the right side of the expression (1) is a value calculated from a value of the time series data 122 of the update target set to the inflow vertex 301. The fourth term of the right side of the expression (1) is a value calculated from a value of the different time series data 122 of the inflow vertex 301. It is to be noted that the third and fourth terms of the right side of the expression (1) represent sum values of the function which includes the value of the time series data 122 set to the inflow vertex 301 as a variable.

The expression (1) is a differential equation called reaction diffusion equation. The first and second terms of the right side of the expression (1) are each called reaction term, and the third and fourth terms of the right side of the expression (1) are each called diffusion term.

Since the values of same data act in a direction in which they increase the update value as indicated by the expression (1), the first and third terms have the positive sign. On the other hand, since values of different data act in a direction in which they decrease the update value, the second and fourth terms have the negative sign.

It is to be noted that, when four time series data 122 are inputted to the graph 300, an expression for determining an update value for the time series data A of the target vertex 301 and an update expression for the time series data A of the target vertex 301 are given by expressions (3) and (4) below, respectively.

[Expression 3]

$$\Delta D_{i,A} = \\ f(D_{i,A}) - g(D_{i,B}, D_{i,C}, D_{i,D}) + \sum_j h(D_{j,A}) - \sum_j l(D_{j,B}, D_{j,C}, D_{j,D}) \quad (3)$$

[Expression 4]

$$D_{i,A} \leftarrow D_{i,A} + \Delta D_{i,A} \quad (4)$$

The expression (3) is different from the expression (1) in that it includes an increased number of variables of the functions g and l. The general form of the update expressions does not rely upon the number of time series data 122 to be inputted to the graph 300.

Here, the process at step S505 is described using the portion in the frame 310 of FIG. 3A. Here, it is assumed that the update value is determined in accordance with the expression (5) given below. It is assumed that the value of the time series data A of the vertex I0 (301) is "0" and the value of the time series data B of the vertex I0 (301) is "10." Further, it is assumed that the value of the time series data A of the vertex I1 (301) is "10" and the value of the time series data B of the vertex I1 (301) is "20." Furthermore, the value of the time series data A of the vertex I6 (301) is "20," and the value of the time series data B of the vertex I6 (301) is "5."

[Expression 5]

$$\Delta D_{i,A} = 10 \times D_{i,A} - D_{i,A}^2 - D_{i,B} + \sum_j D_{j,A} - \sum_j D_{i,B} \quad (5)$$

In this case, the updated value of the time series data A of the vertex I0 (301) is "3" as indicated by the following expression (6):

[Expression 6]

$$\Delta D_{i,A} = 10 \times 0 - 0^2 - 2 + (10+20) - (20+5) = 3 \quad (6)$$

Accordingly, the value of the column of the time series data A in the vertex data region 404 in the entry corresponding to the vertex I0 (301) is updated from "0" to "3." It is to be noted that, at this point of time, the data processing unit 120 does not update the value of the time series data 122 of the vertex I0 (301). The data processing unit 120 stores the update values which associate the identifier of the vertex 301 and the identifier of the time series data 122 with each other into the memory 111. Such processes as described above are executed at step S505.

Then, the data processing unit 120 updates the value of each vertex 301 on the basis of a result of the update value calculation process (step S506). In particular, the data processing unit 120 adds the update value to the vertex data region 404 of the entry corresponding to each vertex 301 included in the graph 300. At this time, the data processing unit 120 adds "1" to the variable representative of the number of times of execution of the loop process.

Thereafter, the data processing unit 120 decides whether or not the number of times of execution of the loop process is greater than a predetermined threshold value (step S507).

If the number of times of execution of the loop process is equal to or smaller than the predetermined threshold value, then the data processing unit 120 returns the processing to step S505 to execute similar processes. If the number of times of execution of the loop process is greater than the predetermined threshold value, then the data processing unit 120 stores the structure data 400 as pattern data 123 into the memory 111 (step S508). Thereafter, the data processing unit 120 ends the pattern data generation process.

It is to be noted that the data processing unit 120 may output the structure data 400, from which the columns for the outflow vertex ID 402 and the inflow vertex ID 403 are deleted, as pattern data 123.

In the embodiment 1, the values of the vertexes 301 in the vertex data region 404 are not initialized. This is because to allow the values to be left makes it possible to perform a process in which a result of processing in the preceding operation cycle is reflected. It is to be noted that the data processing unit 120 may initialize, after it stores the pattern data 123 into the memory 111, the values of the vertexes 301 of the graph data 121 in the vertex data region 404.

The data processing unit 120 disperses the value of time series data 122 inputted to a certain vertex 301 to vertexes 301 of the graph 300 by repetitively executing the loop process by the predetermined number of times. Since values set to the vertexes 301 disperse while interacting with each other as indicated by the expression (3), the values of the time series data 122 set to the vertexes 301 are different from each other. Accordingly, the pattern data 123 is data indicative of a distribution of values of the time series data 122 and forms a geometrical pattern if differences in value are visualized.

As depicted in FIG. 7, the graph 300 to which no time series data 122 is inputted does not form any pattern. On the other hand, if the values of the time series data 122 at a certain point of time are inputted to the graph 300, then pattern data 123 which forms a pattern is outputted.

The pattern data 123-1 represents data outputted by the pattern data generation process for the first time. The pattern data 123-2 represents data outputted by the pattern data generation process for the second time; the pattern data 123-3 represents data outputted by the pattern data generation process for the third time; and the pattern data 123-4 represents data outputted by the pattern data generation process for the fourth time. In the embodiment 1, every time the pattern data generation process is executed, one pattern data 123 is generated.

Generally, a column included in the vertex data region 404 corresponds to protein and each value of time series data 122 stored in the column corresponds to a concentration, and a reaction diffusion equation relates to formation of a pattern of animals and plants or the like.

In this manner, the data processing unit 120 can generate, from a plurality of time series data 122, pattern data 123 indicative of a transient response which takes an influence between data into consideration. In other words, the data processing unit 120 can generate various pattern data 123 from a plurality of input data.

The data processing unit 120 executes an identification process using the pattern data 123 generated by the pattern data generation process.

FIG. 8 is a diagrammatic view illustrating an example of an inputting method of pattern data 123 to the identifier in the embodiment 1. FIG. 9 is a view depicting an example of a list used when a converter in the embodiment 1 converts data of a vertex.

First, the data processing unit 120 inputs values to be set to the vertexes 301 of the pattern data 123 to a converter 801 such that the values are converted into data of a data format which can be handled by the identifier.

To one vertex 301, values in number equal to the number of time series data 122 inputted to the graph 300 are set. It is necessary to input, to a CNN 802 which is used as an identifier, one-dimensional data to one vertex 301. Therefore, the converter 801 converts a plurality of values set to one vertex 301 into one-dimensional data.

For example, the converter 801 may use the following conversion method in which such a list 900 which associates data IDs and conversion values with each other as depicted in FIG. 9 is used. The converter 801 refers to a plurality of values set to one vertex 301 and specifies an identifier of the time series data 122 which exhibits the highest value. The converter 801 inputs a conversion value corresponding to the specified identifier of the time series data 122 to the CNN 802 based on the list 900. It is to be noted that the conversion value is stored into the memory 111.

For example, in the case of a vertex 301 with regard to which the value of the time series data A is "10"; the value of the time series data B is "20"; the value of the time series data C is "0"; and the value of the time series data D is "5," a conversion value "0.25" is inputted as the value of the vertex 301 to the CNN 802.

Upon learning, the data processing unit 120 inputs pattern data 123 generated from time series data 122 for learning to the CNN 802. In the identification process, the data processing unit 120 inputs pattern data 123 generated from time series data 122 for identification to the CNN 802.

The CNN 802 outputs a value corresponding to a class into which the pattern data 123 is to be classified. For example, if the output value indicative of a value of a first class is "0.5" or more and besides the output value of the other classes is lower than "0.5," then the inputted data is classified into the first class.

FIG. 10 is a view illustrating identification accuracy of an identification process of the computer 101 in the embodiment 1.

In FIG. 10, identification accuracy of an identification process which classifies data into four classes is illustrated It is to be noted that the value in each parentheses of identification accuracy represents identification accuracy when the output value for each class is "0.5" or more. For example, a case is considered in which the number of test sample data to be inputted to the first class is 1000 and the output value of the first class is "0.5" or more and besides the number of data whose identification result is the first class is 250. If the number of test sample data whose output value of the first class is lower than 0.5 is 50 from among the 250 test sample data, then the detection accuracy degree is 80% as indicated by the expression (7) given below.

[Expression 7]

$$\frac{(250-50)}{250} \times 100 = 80[\%] \qquad (7)$$

As depicted in FIG. 10, it is demonstrated that the identification accuracy of the identification process is improved by using the pattern data 123.

Although, in the present embodiment, an NN or a CNN is used as an identification unit, by suitably changing the conversion method of the converter 801, it is possible to cope also with a different identification algorithm such as a support vector machine.

(Modification to Embodiment 1)

Figure 11:
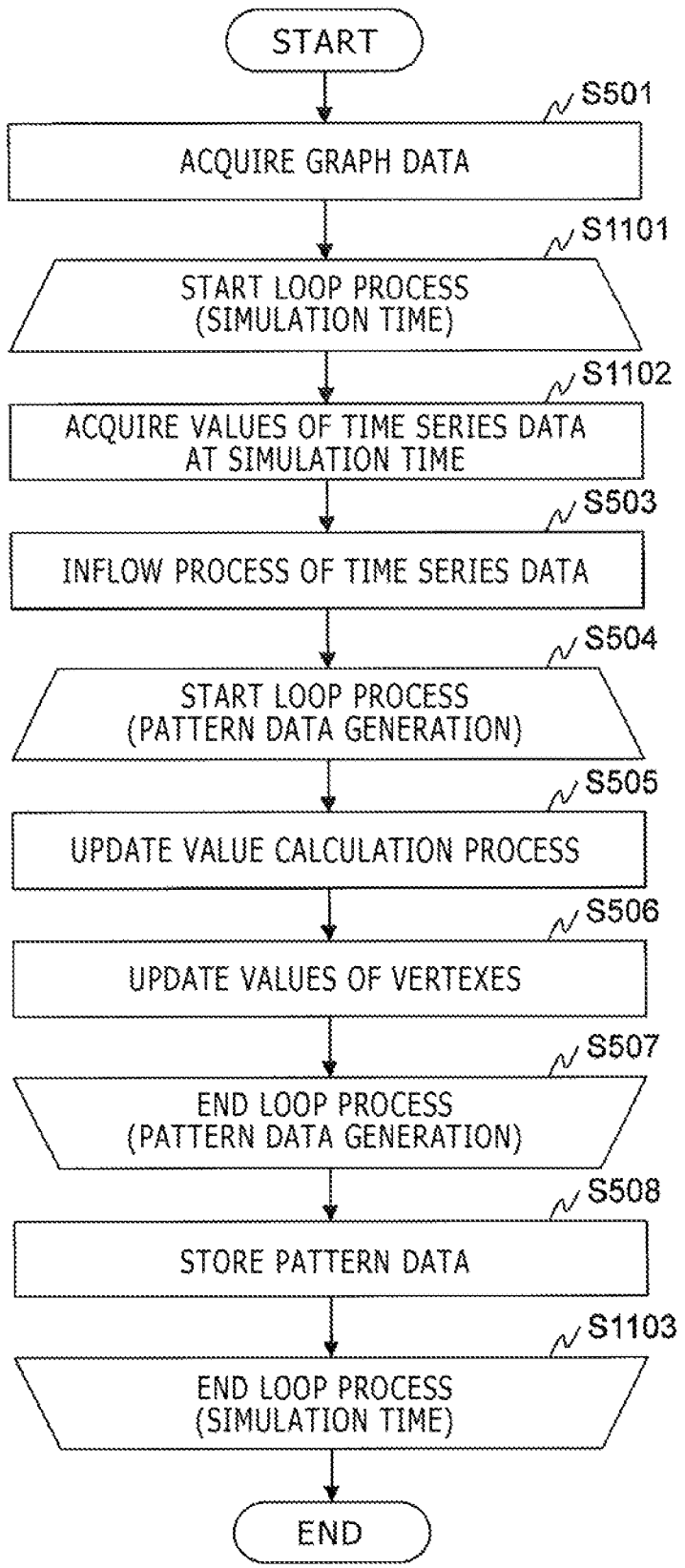
FIG. 11 is a flow chart illustrating a modification to the pattern data generation process executed by the data processing unit in the embodiment 1.

Here, a pattern data generation process based on a simulation is described. FIG. 11 is a flow chart illustrating a modification to the pattern data generation process executed by the data processing unit 120 in the embodiment 1.

The data processing unit 120 starts a loop process for simulation time after it acquires graph data 121 (step S1101). In particular, the data processing unit 120 sets the time most in the past of time series data 122 to a variable representative of simulation time. Thereafter, the data processing unit 120 executes the process repetitively until the simulation time coincides with the time most in the future of the time series data 122.

The data processing unit 120 acquires the values of the time series data 122 at the simulation time from the storage system 102 and stores the acquired values of the time series data 122 into the memory 111 (step S1102).

After the data processing unit 120 stores pattern data 123 generated on the basis of the values of the time series data 122 at arbitrary simulation time into the memory 111 (step S508), it decides whether or not the simulation time coincides with the time most in the future (step S1103).

If the simulation time does not coincide with the time most in the future, the data processing unit 120 updates the simulation time and then returns the processing to step S1102 to execute similar processes. If the simulation time coincides with the time most in the future, then the data processing unit 120 ends the pattern data generation process.

Embodiment 2

In an embodiment 2, a different input value from that in the embodiment 1 is used. In the embodiment 2, the data processing unit 120 converts a value of time series data 122 into a number of particles and inputs a predetermined number of particles as an input value to the graph 300. In the following, the embodiment 2 is described focusing on the difference from the embodiment 1.

The computer system 100 of the embodiment 2 has a configuration same as that of the computer system 100 of the embodiment 1, and therefore, description of the same is omitted herein. Further, the computer 101 and the storage system 102 in the embodiment 2 have configurations same as those of the computer 101 and the storage system 102 in the embodiment 1, and therefore, description of them is omitted herein.

Further, the structure data 400 of the graph data 121 in the embodiment 2 is same as the structure data 400 of the graph data 121 in the embodiment 1 and therefore, description of the same is omitted herein. The inflow definition data 410 of the graph data 121 in the embodiment 2 does not include the standardization constant 413. The time series data 122 in the embodiment 2 is same as the time series data 122 in the embodiment 1, and therefore, description of the same is omitted herein.

FIG. 12 is a flow chart illustrating a pattern data generation process executed by the data processing unit 120 in the embodiment 2. FIGS. 13 and 14 are diagrammatic views illustrating a concept of an inflow process of time series data 122 and an outflow process of particles in the embodiment 2.

The data processing unit 120 acquires values of the time series data 122 at the present point of time (step S502) and then executes an inflow process of the time series data 122 (step S1201). In particular, the following processes are executed.

The data processing unit 120 generates columns in number equal to the number of the time series data 122 in the vertex data region 404 of the structure data 400. The data processing unit 120 sets "0" as an initial value to the generated columns. It is to be noted that, if columns are generated already in the vertex data region 404, then the process just described is omitted.

The data processing unit 120 selects a value of a target from among the acquired values of the time series data 122. The data processing unit 120 converts the target value into a number of particles.

Various conversion algorithms may be applied to convert a value into a number of particles. For example, if the value includes a fraction, then an algorithm which converts the value into an integer by rounding up, rounding down or rounding off may be applied. Alternatively, another algorithm which converts a value into a number of particles by scaling may be applied. It is to be noted that different conversion algorithms may be set to different ones of the time series data 122.

The data processing unit 120 refers to the data ID 411 of the inflow definition data 410 to search for an entry which coincides with the identifier of the time series data 122 corresponding to the target value. The data processing unit 120 acquires an identifier of the vertex 301 from the vertex ID 412 in the searched out entry. The data processing unit 120 refers to the vertex ID 401 of the structure data 400 to search for an entry which coincides with the acquired identifier of the vertex 301.

The data processing unit 120 refers to the vertex data region 404 in the searched out entry to specify a column in which the input value (number of particles) is to be set. The data processing unit 120 updates the value in the column specified using the input value. For example, the data processing unit 120 overwrites the number of particles in the specified column or adds the number of particles to the value stored in the specified column.

The data processing unit 120 executes the processes described above for all values of the time series data 122.

For example, where the value of time series data 122 is "10," the value is converted into a number of particles "10," which is placed into the column of the vertex data region 404 for the predetermined vertex 301.

Where a value of time series data 122 is handled as a number of particles, the sum total of the number of particles of the time series data 122 included in the graph 300 does not vary in principle.

After the process at step S1201, the data processing unit 120 starts a loop process for generating pattern data 123 (step S504). Upon starting of the loop process, the data processing unit 120 sets "1" to the variable indicative of a number of times of execution of the loop process.

The data processing unit 120 executes an updating process of a value (step S1202). In the updating process of a value, the data processing unit 120 updates the value set to each vertex 301 by moving a predetermined number of particles to each vertex 301. In particular, the following processes are executed.

The data processing unit 120 refers to the vertex data region 404 of the structure data 400 to select a type of a particle of a target. The data processing unit 120 refers to the vertex data region 404 of the structure data 400 to search for an entry in which the value of a column corresponding to the type of the target particle is higher than "0." In other words, a vertex 301 to which a particle corresponding to the type of the particle of the processing target is set is searched out. The data processing unit 120 selects one vertex 301 (entry) of the target from within the searched out entry.

The data processing unit 120 acquires the inflow vertex ID 403 of the selected entry and searches for an entry in which the vertex ID 401 coincides with the identifier of the acquired vertex 301.

The data processing unit 120 acquires a number of particles of the type of the target particle set to the target vertex 301 and a number of particles of the type of the target particle set to the inflow vertex 301.

The data processing unit 120 selects one target particle from among the particles corresponding to the type of the target particle. It is to be noted that, since the particles of the same type are not identified from each other, any one of the particles may be selected.

The data processing unit 120 determines the vertex 301 as a movement destination of the selected particle on the basis of the number of particles set to each vertex 301. The vertex 301 of the movement destination of the target particle is determined by an interaction between the number of particles set to the own vertex 301 and the number of particles set to the inflow vertex 301.

In the embodiment 2, since an interaction is replaced into a movement of a particle, an interaction formula is given as a movement determination expression of a particle.

For example, where the vertex data region 404 in the selected entry includes columns for the time series data A and the time series data B, the movement determination expression of a particle of the time series data A of the vertex 301 of the processing target is given by the following expression (8).

[Expression 8]

$$P_{i,A} = f(N_{i,A}) - g(N_{i,B}) + \sum_j h(N_{j,A}) - \sum_j l(N_{j,B}) \quad (8)$$

where $N_{i,A}$ represents a number of particles of the time series data A before updating set to the target vertex 301 whose identifier is "i"; $N_{i,B}$ a number of particles of the time series data B before updating set to the target vertex 301 whose identifier is "i"; $f(N_{i,A})$ a function which includes $N_{i,A}$ as a variable; $g(N_{i,B})$ a function which includes $N_{i,B}$ as a variable; $h(N_{j,A})$ a function which includes, as a variable, a number of particles of the time series data A set to an inflow vertex 301 whose identifier is "j"; and $l(N_{j,B})$ a function which includes, as a variable, a number of particles of the time series data B set to the inflow vertex 301 whose identifier is "j."

The data processing unit 120 uses the value of $P_{i,A}$ and the threshold value to decide whether or not one of particles of the time series data A set to the target vertex 301 is to be moved to the inflow vertex 301. For example, where $P_{i,A}$ is higher than 0, the data processing unit 120 decides that one particle is to be moved, but where $P_{i,A}$ is equal to or lower than 0, the data processing unit 120 decides that one particle is not to be moved.

It is to be noted that, where a plurality of inflow vertexes 301 are involved, the data processing unit 120 selects one inflow vertex 301 as the movement destination from among the plurality of inflow vertexes 301.

When a particle is to be moved to an inflow vertex 301, the data processing unit 120 refers to the vertex data region 404 in the entry of the target vertex 301 to decrement the number of target particles by one. Further, the data processing unit 120 refers to the vertex data region 404 in the entry of the inflow vertex 301 and increments the number of target particles by one.

When a particle is not to be moved to the inflow vertex 301, the data processing unit 120 does not perform updating of the vertex data region 404 in the entries.

The data processing unit 120 executes the processes described above for all particles of the selected type. Further, the data processing unit 120 executes the same processes for the particles of all types set to the target vertex 301.

It is to be noted that, where an attribute such as the distance is applied to the side 302, a particle may be moved taking the attribute into consideration. For example, where "5" is set as the distance to the side 302, a particle may be moved after the loop process from step S504 to step S507 is executed by five times.

In the embodiment 2, since a particle is moved to a vertex 301 determined in accordance with the expression (8), such updating as at step S506 in the embodiment 1 is not performed. For example, if the number of particles of the time series data B is "2" and one particle is moved to the inflow vertex 301, then the number of particles of the time series data B upon execution of the decision process using the expression (8) for the other particles of the time series data B becomes "1." Such processes as described above are executed at step S1202.

Thereafter, the data processing unit 120 executes an outflow process of a particle (step S1203). In the outflow process of a particle, a particle which satisfies a predetermined condition is outputted (deleted) from the graph 300. In particular, the following processes are executed.

In the embodiment 2, a particle is inputted to the graph 300. Therefore, every time series data 122 is inputted, the number of particles stored in the graph 300 increases. Therefore, the data processing unit 120 deletes a particle which satisfies a predetermined condition from the graph 300 to decrease the number of particles stored in the graph 300. As a method for deleting a particle from the graph 300, such a method as illustrated in FIG. 13 or FIG. 14 may be performed.

In FIG. 13, the data processing unit 120 in the present embodiment outputs, after execution of an updating process of a value, a particle which has moved to a vertex 301 on an outer periphery of the lattice-like graph 300 to a path 1300. The particle is discharged from an outlet 1301 through the path 1300. In other words, the particle is deleted from the graph 300. As the data process, the number of particles set to the vertex 301 is initialized. It is to be noted that the vertex 301 from which a particle is to be outputted is not limited to a vertex 301 on the outer periphery.

As a method for setting a vertex 301 from which a particle is to be outputted, a method which provides a column for identification of a vertex 301 from which a particle is to be outputted in the structure data 400 may be available.

As particular processes, the data processing unit 120 refers to the structure data 400 and stores the total value of the values in all columns of the vertex data region 404 in an entry corresponding to a vertex 301 on the outer periphery as a number of output particles into the memory 111. Further, the data processing unit 120 sets the values in all columns of the vertex data region 404 in the entry to "0."

By summing the number of particles stored in the graph 300 and the number of output particles, the total number of inputted particles can be grasped.

In FIG. 14, the memory 111 includes a particle storage region 1400 for storing particles for each time series data 122. In the particle storage region 1400, a predetermined number of particles are stored in advance. In particular, a value indicative of a number of particles is stored in each particle storage region 1400. It is to be noted that the particle storage regions 1400 are generated upon starting of a pattern data generation process.

In the inflow process of time series data 122, the data processing unit 120 converts values of the time series data 122 into the number of particles, extracts a number of particles equal to the number of particles from the corresponding particle storage region 1400 and inputs the extracted particles to a vertex 301. At this time, the data processing unit 120 decrements the value in the particle storage region 1400 by a value equal to the number of extracted particles.

In the outflow process of a particle, the data processing unit 120 stores particles to be set to a vertex 301 on the outer periphery into the particle storage region 1400 through the path 1300 and the outlet 1301. As a data process, the data processing unit 120 increments the value in the particle storage region 1400 by the value in the vertex data region 404.

It is to be noted that, if, in the inflow process of time series data 122, a number of particles equal to the number of converted particles are not stored in the particle storage region 1400, then the data processing unit 120 inputs particles in number equal to the number of particles which can be extracted to the graph 300. For example, if the number of converted particles is "10" and the number of particles in the particle storage region 1400 is "3," then the data processing unit 120 inputs three particles to the graph 300. Consequently, the influence of time series data 122 having a high strength decreases. This is applied incorporating the nature that a cell which is excited remains less sensitive for a while.

FIGS. 15A and 15B are diagrammatic views illustrating examples of the pattern data 123 in the embodiment 2.

Here, pattern data 123 when two time series data groups having different phases from each other are inputted are depicted. One of the time series data groups includes four time series data 122. Further, it is assumed that the graph 300 to be used is a lattice-like graph 300. Further, it is assumed that the management method for a particle illustrated in FIG. 14 is adopted.

In FIGS. 15A and 15B, a vertex 301 to which no particle is inputted is represented by a blank round mark, and the vertexes 301 are indicated in different colors in accordance with the type of particles whose number of particles is greatest. As depicted in FIGS. 15A and 15B, every time the pattern data generation process is executed, one pattern data 123 is generated. If time series data 122 of a different phase are inputted, then pattern data 123 of different patterns are outputted. By using such pattern data 123 as just described, the identification accuracy of the identification process can be improved.

Embodiment 3

In an embodiment 3, a region for a graph 300 is divided for every time series data 122. Further, in the embodiment 3, a value of time series data 122 is converted into a number of particles. In the following, the embodiment 3 is described focusing on the differences thereof from the embodiment 2.

The computer system 100 of the embodiment 3 has a configuration same as that of the computer system 100 of the embodiment 1, and therefore, description of the same is omitted herein. Further, the computer 101 and the storage system 102 in the embodiment 3 have configurations same as those of the computer 101 and the storage system 102 in the embodiment 1, and therefore, description of them is omitted herein.

Further, the inflow definition data 410 of the graph data 121 in the embodiment 3 does not include the standardization constant 413. Since the time series data 122 in the embodiment 3 is same as the time series data 122 in the embodiment 1, and therefore, description of the same is omitted herein.

Figure 17:
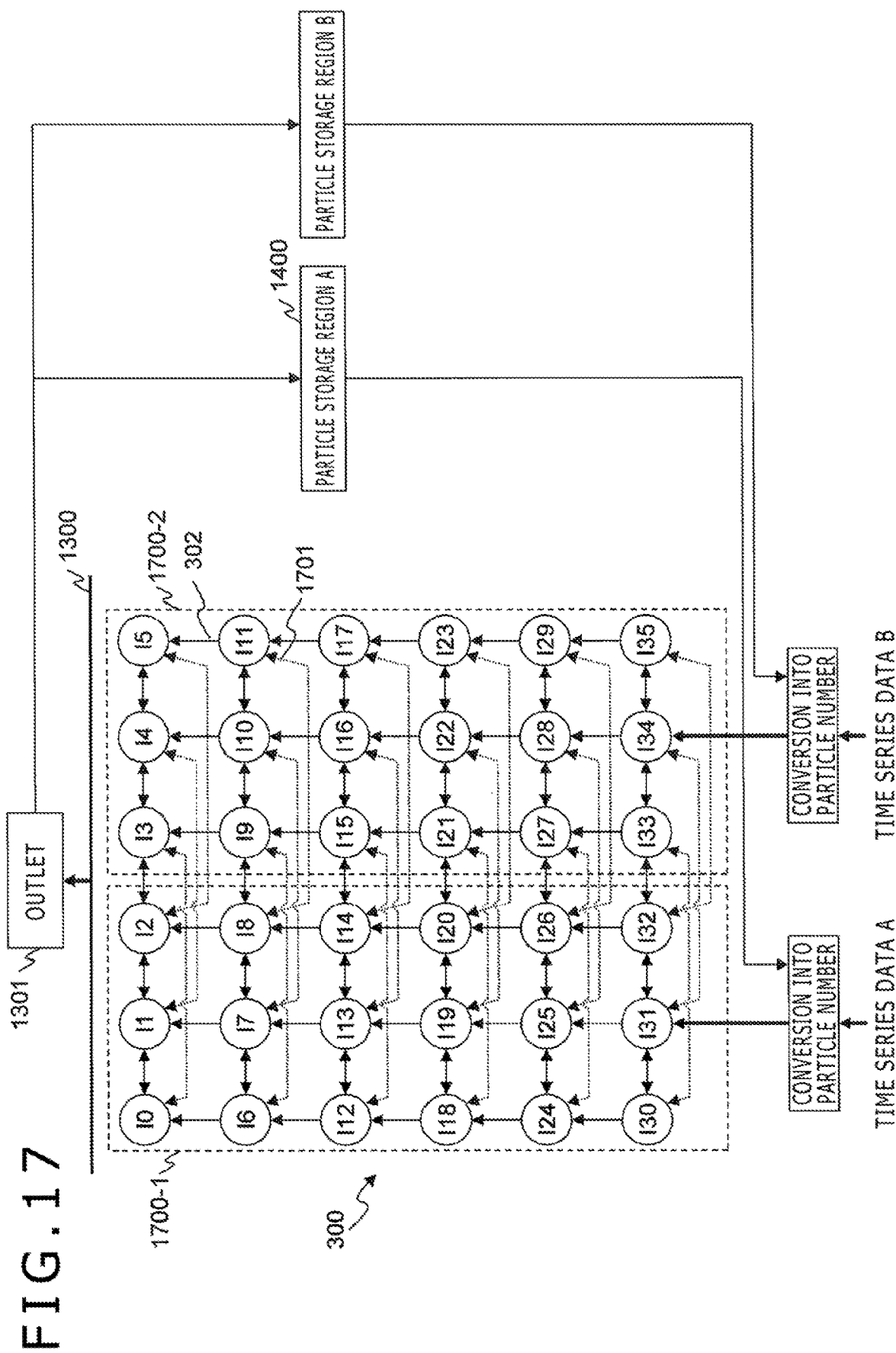
FIG. 17 is a diagrammatic view illustrating an example of a graph in the embodiment 3.

In the embodiment 3, the structure data 400 of the graph data 121 is different. FIG. 16 is a view illustrating an example of the structure data 400 of the graph data 121 in the embodiment 3. FIG. 17 is a view illustrating an example of the graph 300 in the embodiment 3.

The structure data 400 includes, in addition to the vertex ID 401, outflow vertex ID 402, inflow vertex ID 403 and vertex data region 404, an active vertex ID 1601 and a suppression vertex ID 1602.

The active vertex ID 1601 is an identifier of a vertex 301 which provides a retention action to a particle set to the vertex 301. The suppression vertex ID 1602 is an identifier of a vertex 301 which provides a movement action to a particle set to the vertex 301. A difference in action between vertexes is represented as a difference in polarity in the expression (8). The retention action corresponds to the second and fourth terms of the expression (8) and the active action corresponds to the first and third terms of the expression (8).

In the embodiment 3, a flow of a particle between vertexes 301 is managed with the outflow vertex ID 402 and the inflow vertex ID 403, and an interaction between vertexes 301 is managed with the active vertex ID 1601 and the suppression vertex ID 1602.

The graph 300 corresponding to the structure data 400 illustrated in FIG. 16 is the graph 300 depicted in FIG. 17. The graph 300 is divided into a plurality of regions 1700 in advance in accordance with the number of time series data 122 inputted to the graph 300. Further, vertexes 301 which have a same relative position in the regions 1700 are connected to each other by a side 1701 which provides a suppression action.

The graph 300 depicted in FIG. 17 is structured such that a particle moves in an upward direction from below. Accordingly, a value of each time series data 122 is inputted to a vertex 301 at the lowermost position. Further, a particle having moved to a vertex 301 at the uppermost position is outputted to the particle storage region 1400 through the path 1300 and the outlet 1301.

By using such a graph 300 as just described, a history in the time direction can be left. In particular, around vertexes 301 at a lower position, an influence of a new value of time series data 122 is reflected, but around vertexes 301 at an upper position, an influence of an old value of time series data 122 is reflected.

It is to be noted that the structure of the graph 300 depicted in FIG. 17 is an example, and the structure of the graph 300 is not limited to this. The graph 300 can be configured in various structures by changing the outflow vertex ID 402, inflow vertex ID 403, active vertex ID 1601 and suppression vertex ID 1602. For example, a multilayer bipartite graph such as, for example, a scale-free graph, a random graph and a neural network can be configured.

Figure 18:
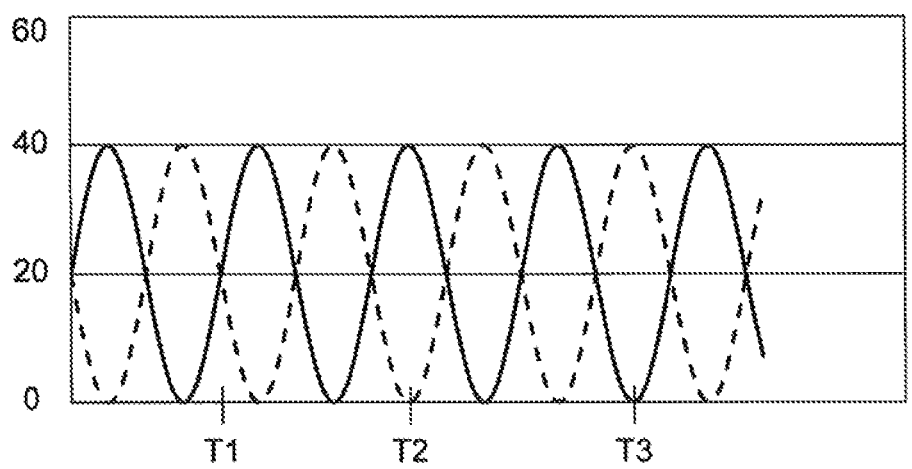
FIG. 18 is a diagram illustrating an example of time series data inputted upon generation of pattern data in the embodiment 3.
Figure 19:
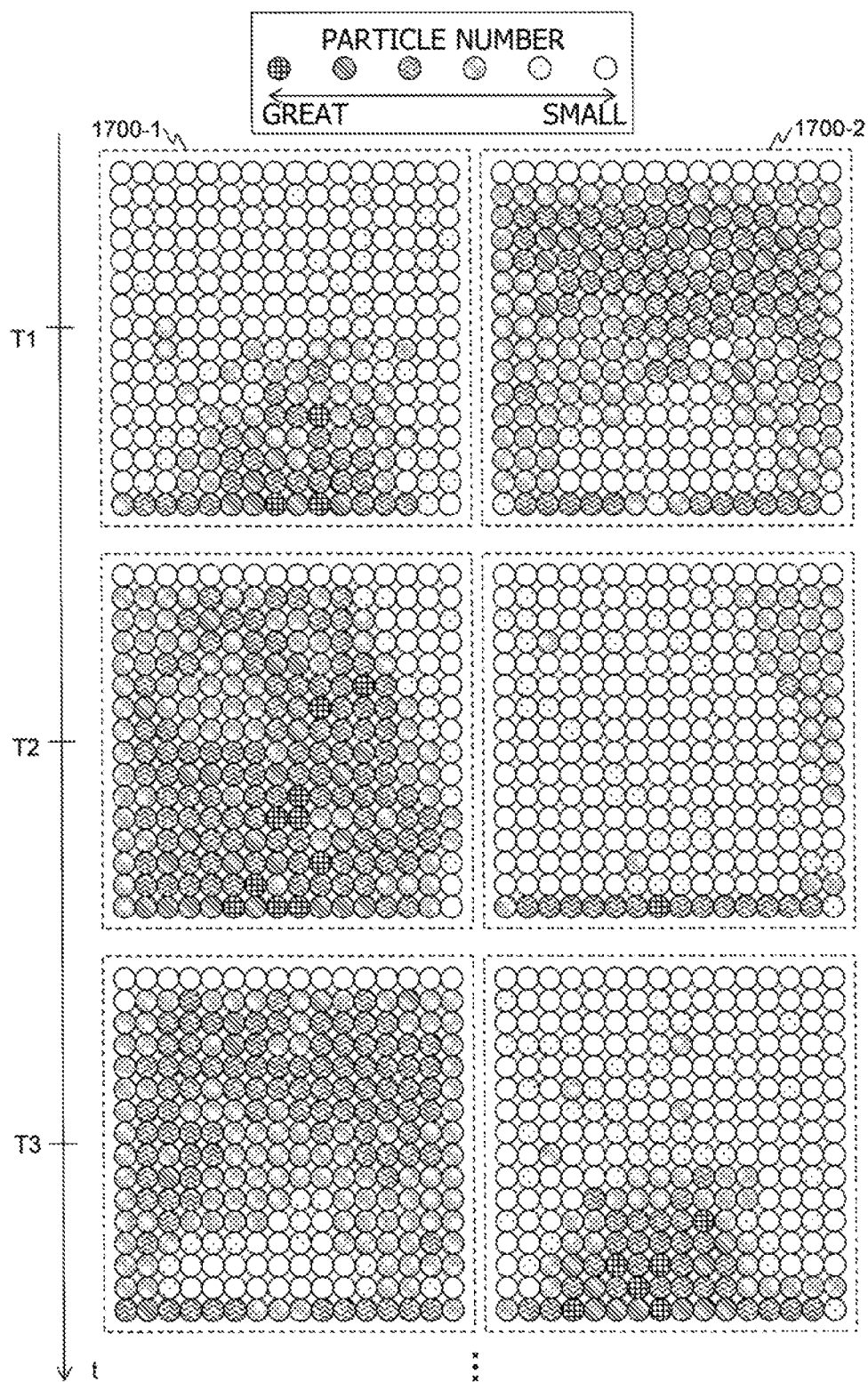
FIG. 19 is a diagrammatic view illustrating an example of pattern data in the embodiment 3.

FIG. 18 is a diagram illustrating an example of the time series data 122 inputted upon generation of pattern data 123 in the embodiment 3. FIG. 19 is a diagrammatic view illustrating an example of the pattern data 123 in the embodiment 3.

It is assumed that two such time series data 122 as illustrated in FIG. 18 are inputted to the graph 300. The graph 300 is such a lattice-shaped graph as depicted in FIG. 17 and is divided into two regions 1700-1 and 1700-2. It is assumed that a value of each time series data 122 is inputted to a vertex 301 at the center of a lowermost position of each of the regions 1700-1 and 1700-2. Further, it is assumed that a particle is outputted from a vertex 301 at an uppermost position of each of the regions 1700-1 and 1700-2. Furthermore, it is assumed that a suppression action acts between the region 1700-1 and the region 1700-2 as depicted in FIG. 17.

In FIG. 19, the display format of a vertex 301 is changed in response to the number of particles set to the vertex 301.

As depicted in FIG. 19, pattern data 123 on which a history is reflected from a vertex 301 at a lower position toward a vertex 301 at an upper position of the graph 300 are generated. It can be seen that each of the region 1700-1 and the region 1700-2 is influenced by the number of particles in the other region 1700. For example, a vertex 301 in the region 1700-2 influenced by a suppression action from a vertex 301 great in number of particle in the region 1700-1 is small in number of particle.

Embodiment 4

An embodiment 4 described below is directed to a control system for an apparatus in which the pattern data generation process described hereinabove in connection with the embodiments 1 to 3 is used. Here, description is given taking a system which measures a chemical substance or the like, identifies a class to which an identification target belongs and controls an apparatus on the basis of a result of the identification as an example.

The system includes two chemical sensors, one temperature sensor and one humidity sensor. It is to be noted that the types of the sensors are not limited to them, and various sensors such as a piezoelectric sensor, a gravity sensor, an optical sensor, an infrared sensor, a vibration sensor, an acceleration sensor, a thermal sensor, a speed sensor, a rotational speed sensor, a flow sensor and a sound sensor can be used.

The system periodically acquires a value measured by each sensor. The value acquired from each sensor corresponds to a value of time series data 122. Further, in the system, a class to which an identification target belongs is identified using pattern data 123 generated from values acquired from the sensors. Further, it is assumed that the system determines contents of control of the apparatus on the basis of a result of the identification.

For example, where the system is a system for controlling a robot in which wheels and a motor are incorporated and uses three classes of "feed," "natural enemy" and "others," the following control is performed. If the identification result is "feed," then the system controls the rotational speed of the motor and the direction of the wheels such that the robot approaches an arbitrary target. If the identification result is "natural enemy," then the system controls the rotational speed of the motor and the direction of the wheels such that the robot moves away from an arbitrary target. Further, if the identification result is "others," then the system determines contents of control such that a behavior in the preceding operation cycle is maintained.

It is assumed that the system has a hardware configuration and a software configuration similar to those of the computer 101 in the embodiment 1.

Figure 20:
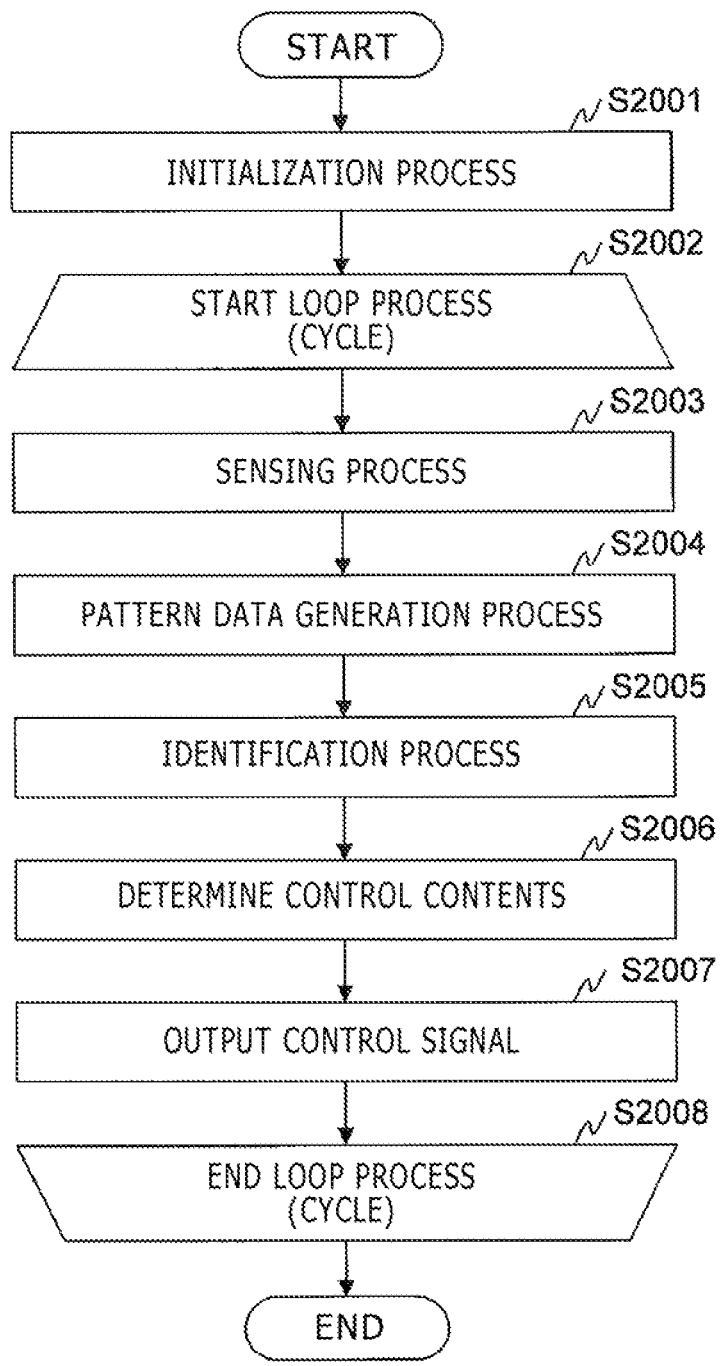
FIG. 20 is a flow chart illustrating a process executed by a system of an embodiment 4.

FIG. 20 is a flow chart illustrating a process to be executed by the system in the embodiment 4.

After the system is activated, the CPU 115 executes an initialization process (step S2001). Thereafter, the CPU 115 starts a loop process (step S2002). The loop process is executed periodically. The system continuously executes the loop process until after it receives an explicit stopping instruction of the process such as turning off of the power supply.

The CPU 115 executes a sensing process (step S2003). In particular, the CPU 115 issues an instruction for measurement to the sensors. Each sensor performs measurement for the identification target. A result of the measurement is stored into the memory 111.

Then, the CPU 115 executes a pattern data generation process (step S2004). The pattern data generation process here may be any of the pattern data generation processes described hereinabove in connection with the embodiments 1 to 3. Pattern data 123 generated by the pattern data generation process is stored into the memory 111.

Then, the CPU 115 executes an identification process using the pattern data 123 (step S2005). For the identification process, the identification process described hereinabove in connection with the embodiment 1 is applied. A result of the identification is stored into the memory 111.

It is to be noted that, as occasion demands, the CPU 115 may transmit the identification result to an external apparatus or may display the identification result on an outputting apparatus such as a display unit. It is to be noted that, as the displaying method of the identification result, a method for displaying using a figure, a table or characters may be applied. Further, where the system includes light emitting diodes (LEDs) corresponding to the classes, a method of causing the LED corresponding to the identification result to flicker or a like method may be applied.

Then, the CPU 115 determines contents of control of the apparatus on the basis of the identification result (step S2006) and outputs a control signal for executing the determined control contents to the apparatus (step S2007). If a predetermined condition is satisfied, the CPU 115 ends the loop process (step S2008).

For example, the system retains programs to be executed for the individual classes as subroutines or libraries in advance and executes the program of the corresponding class on the basis of the identification result.

Where the system controls a robot in which wheels and a motor are incorporated, the CPU 115 determines the rotational speed of the motor and the direction of the wheels and outputs a control signal for changing the rotational speed of the motor and the direction of the wheels to the robot. Consequently, the robot can be controlled in accordance with the class.

Embodiment 5

An embodiment 5 is directed to a data analysis system which uses any of the pattern data generation processes described hereinabove in connection with the embodiments 1 to 3. Here, a big data process is taken as an example.

In internet of things (IoT), data are acquired from a plurality of apparatus connected through a network. By analyzing a large amount of data, useful knowledge can be obtained. Data acquired from apparatus may be logs of the purchase, stock price, exchange, weather, SNS and so forth. Further, as classes, demand expansion, demand reduction, maintenance of the status quo and so forth may be available.

Further, a data center acquires data indicative of a state of an apparatus included in the data center. By analyzing a large amount of data, optimum operation of the data center can be anticipated.

A particular flow of processes is same as that in the embodiment 4. However, data acquired as time series data 122 is values acquired from an apparatus or the like connected through a network. In the embodiment 5, the processes at steps S2006 and S2007 may not be executed.

It is to be noted that the present invention is not limited to the embodiments described hereinabove but includes various modifications. Further, the embodiments in the foregoing description have been described in detail in regard to the configuration in order to facilitate understandings of the present invention, and the present invention is not necessarily limited to the embodiments which include all of the constructs described hereinabove. Further, it is possible to add, delete or replace some constructs of the embodiments to, from or with other constructs.

Further, the constructs, functions, processing units, processing means and so forth described above may be partly or entirely implemented by hardware, for example, by designing them in an integrated circuit or the like. Further, the present invention can be implemented also by a program code of software which implements the functions of the embodiments. In this case, a storage medium in which the program code is recorded is provided to a computer, and a processor provided in the computer reads out the program code stored in the storage medium. In this case, the program code itself read out from the storage medium implements the functions of the embodiments, and the program code itself and the storage medium in which the program code is stored constitute the present invention. As the recording medium for supplying such a program code as described above, for example, a flexible disk, a compact disc read only memory (CD-ROM), a digital versatile disc (DVD)-ROM, a hard disk, a solid state drive (SSD), an optical disk, a magneto-optical disk, a CD-recordable (R), a magnetic tape, a non-volatile memory card, a ROM and so forth are used.

Further, the program code for implementing the functions described in the description of the embodiments can be incorporated in a wide range of programs such as, for example, an assembler, C/C++, perl, Shell, professional hypertext preprocessor (PHP) or Java (registered trademark) or a script language.

Further, the program code of software which implements the functions of the embodiments may be distributed through a network such that it is stored into storage means of a computer such as a hard disk or a memory or into a storage medium such as a CD-rewritable (RW) or a CD-R and a processor provided in the computer reads out and executes the program code stored in the storage means or the storage medium.

In the embodiments described above, control lines and information lines only necessary for description of the embodiments are indicated, but all control lines or information lines necessary for a product are not necessarily indicated. All constructs may be connected to each other.

What is claimed is:

1. A data generation method for a computer system which includes a plurality of computers each including a processor, a memory connected to the processor and a network interface connected to the processor, at least one of the computers being programmed to acquire a plurality of time series data and generate pattern data representative of a feature value for identifying a class to which an identification target belongs using the plurality of time series data, at least one of the computers including a memory configured to retain graph information for managing a graph configured from a plurality of vertexes and sides which connect the plurality of vertexes to each other, the data generation method comprising:

acquiring the plurality of data and the graph information and assuring storage regions in number equal to the number of vertexes included in the graph for storing the plurality of data;

converting each of the plurality of time series data into an input value and setting at least one input value to a storage region corresponding to at least one of the vertexes included in the graph;

executing an updating process for updating a value set to a storage region corresponding to a first vertex using the value set to the storage region corresponding to the first vertex and a value set to a storage region corresponding to a different vertex directly connected to the first vertex; and outputting a set of values set to the storage regions individually corresponding to the plurality of vertexes included in the graph as the pattern data, the pattern data being the feature value generated from the plurality of time series data and being given as the set of values set to the vertexes of the graph, the pattern data being indicative of a transient response and being the feature value on which an influence between the plurality of time series data and a transient of the time series data are reflected.

2. The data generation method according to claim 1, wherein the memory retains definition information of the vertexes to which the plurality of input values are individually set;

converting the data includes specifying a vertex to which each of the plurality of input values is to be set based on the definition information;

executing the updating process includes updating the value set to the storage region corresponding to the first vertex based on a reaction diffusion equation in which the value set to the storage region corresponding to the first vertex and the value set to the storage region corresponding to the different vertex connected to the first vertex are used; and outputting the set of values includes outputting a set of values set to the storage regions individually corresponding to the plurality of vertexes included in the graph after the updating process is executed by a plural number of times as the pattern data.

3. The data generation method according to claim 2, wherein
the storage regions corresponding to the vertexes have stored therein a number of particles which correspond to each of the plurality of data;
converting the data includes
converting each of the plurality of data into a number of particles corresponding to each of the plurality of data, and
setting the number of particles corresponding to each of the plurality of data to a storage region corresponding to at least one of the vertexes included in the graph; and
executing the updating process includes
deciding whether or not a particle set to the first vertex is to be moved based on the reaction diffusion equation;
determining a vertex of a movement destination of the particle set to the first vertex based on a result of the decision, and
updating the number of particles set to the storage region corresponding to the first vertex based on the determination.

4. The data generation method according to claim 3, further comprising:
managing a plurality of particle storage regions for managing the number of particles corresponding to the plurality of data;
wherein the plurality of vertexes included in the graph include a deletion vertex in which the number of particles set to the storage region corresponding to the vertex is initialized after the updating process is executed;
converting the data includes decrementing the value in the particle storage region for managing the number of particles corresponding to each of the plurality of data by the number of particles set to the storage regions corresponding to the vertexes of the graph; and
initializing the number of particles set to the storage region corresponding to the deletion vertex after the updating process is executed; and
incrementing the value in the particle storage region, which manages the number of particles set to the storage region corresponding to the deletion vertex, by the number of particles set to the storage region corresponding to the deletion vertex.

5. The data generation method according to claim 4, wherein
at least one of the computers is programmed to identify a class to which the identification target belongs using the pattern data.

6. A computer system, comprising:
a plurality of computers each including a processor, a memory connected to the processor, and a network interface connected to the processor;
at least one of the computers including a processor programmed to acquire a plurality of time series data and generate pattern data representative of a feature value for identifying a class to which an identification target belongs using the plurality of time series data;
at least one of the computers including a memory configured to retain graph information for managing a graph configured from a plurality of vertexes and sides which connect the plurality of vertexes to each other;
the processor is programmed to
acquire the plurality of data and the graph information and assure storage regions in number equal to the number of vertexes included in the graph for storing the plurality of data,
convert each of the plurality of time series data into an input value and set at least one input value to a storage region corresponding to at least one of the vertexes included in the graph,
execute an updating process for updating a value set to a storage region corresponding to a first vertex using the value set to the storage region corresponding to the first vertex and a value set to a storage region corresponding to a different vertex directly connected to the first vertex, and
output a set of values set to the storage regions individually corresponding to the plurality of vertexes included in the graph as the pattern data, the pattern data being the feature value generated from the plurality of time series data and being given as the set of values set to the vertexes of the graph, the pattern data being indicative of a transient response and being the feature value on which an influence between the plurality of time series data and a transient of the time series data are reflected.

7. The computer system according to claim 6, wherein
the memory retains definition information of the vertexes to which the plurality of input values are individually set; and
the processor is programmed to
specify, when the input values are to be set to the storage regions corresponding to the vertexes, a vertex to which each of the plurality of input values is to be set based on the definition information,
update, in the updating process, the value set to the storage region corresponding to the first vertex based on a reaction diffusion equation in which the value set to the storage region corresponding to the first vertex and the value set to the storage region corresponding to the different vertex connected to the first vertex are used, and
output a set of values set to the storage regions individually corresponding to the plurality of vertexes included in the graph after the updating process is executed by a plural number of times as the pattern data.

8. The computer system according to claim 7, wherein
the storage regions corresponding to the vertexes have stored therein a number of particles which correspond to each of the plurality of data; and
the processor is programmed to
convert, when the input values are to be set to the storage regions corresponding to the vertexes, each of the plurality of data into a number of particles corresponding to each of the plurality of data, and sets the number of particles corresponding to each of the plurality of data to a storage region corresponding to at least one of the vertexes included in the graph, and
decide, in the updating process, whether or not a particle set to the first vertex is to be moved based on the reaction diffusion equation, determines a vertex of a movement destination of the particle set to the first vertex based on a result of the decision, and updates the number of particles set to the storage region corresponding to the first vertex based on the determination.

9. The computer system according to claim 8, wherein
the processor is programmed to manage a plurality of particle storage regions for managing the number of particles corresponding to the plurality of data;
the plurality of vertexes included in the graph include a deletion vertex in which the number of particles set to the storage region corresponding to the vertex is initialized after the updating process is executed; and
the processor is programmed to
  decrement, when the input values are to be set to the storage regions corresponding to the vertexes, the value in the particle storage region for managing the number of particles corresponding to each of the plurality of data by the number of particles set to the storage regions corresponding to the vertexes of the graph,
  initialize the number of particles set to the storage region corresponding to the deletion vertex after the updating process is executed; and
  increment the value in the particle storage region, which manages the number of particles set to the storage region corresponding to the deletion vertex, by the number of particles set to the storage region corresponding to the deletion vertex.

10. The computer system according to claim 9, wherein at least one of the computers is programmed to identify a class to which the identification target belongs using the pattern data.

* * * * *